US009868552B2

(12) United States Patent
Matsukuma et al.

(10) Patent No.: US 9,868,552 B2
(45) Date of Patent: *Jan. 16, 2018

(54) FLUID TRANSFER APPARATUS, FLUID TRANSFER CONTROL METHOD, FLUID TRANSFER CONTROLLER, FLUID TRANSFER SYSTEM, AND MEDICINE MANUFACTURING METHOD

(71) Applicant: KABUSHIKI KAISHA YASKAWA DENKI, Kitakyushu-shi (JP)

(72) Inventors: Kenji Matsukuma, Fukuoka (JP); Kenichi Tachibana, Fukuoka (JP); Fumiaki Furusawa, Fukuoka (JP); Makoto Umeno, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 184 days.

This patent is subject to a terminal disclaimer.

(21) Appl. No.: 14/636,179

(22) Filed: Mar. 3, 2015

(65) Prior Publication Data
US 2015/0251780 A1 Sep. 10, 2015

(30) Foreign Application Priority Data

Mar. 5, 2014 (JP) .................. 2014-043159

(51) Int. Cl.
*A61J 1/20* (2006.01)
*B65B 3/00* (2006.01)

(52) U.S. Cl.
CPC ............. *B65B 3/003* (2013.01); *A61J 1/2096* (2013.01); *A61J 1/201* (2015.05)

(58) Field of Classification Search
CPC ......... B65B 3/003; A61J 1/2095; A61J 1/201; A61J 1/12; B66C 1/42
See application file for complete search history.

(56) References Cited

U.S. PATENT DOCUMENTS

| 5,479,969 A | 1/1996 | Hardie et al. |
| 5,805,454 A | 9/1998 | Valerino, Sr. et al. |
| 7,128,105 B2 * | 10/2006 | Tribble .................... A61J 1/20 141/198 |

(Continued)

FOREIGN PATENT DOCUMENTS

| CN | 102119018 | 7/2011 |
| CN | 102413807 | 4/2012 |

(Continued)

OTHER PUBLICATIONS

Kuroda et al., High-Speed Cell Manipulation by Backlashless Syringe Pump, 2013, IEEE, p. 148-150.*

(Continued)

Primary Examiner — Mcdieunel Marc
(74) Attorney, Agent, or Firm — Mori & Ward, LLP

(57) ABSTRACT

A fluid transfer system includes a multi-jointed robot which is capable of transferring a vial and a syringe, and a syringe driving apparatus. The syringe driving apparatus includes a cylinder body holder which holds a cylinder body of the syringe, an actuator which pulls and pushes a plunger of the syringe, and a rotation mechanism configured to make the cylinder body holder and the actuator freely rotatable about an axial line intersecting with a center axial line of the syringe.

14 Claims, 20 Drawing Sheets

(56) References Cited

U.S. PATENT DOCUMENTS

| | | | | |
|---|---|---|---|---|
| 7,163,035 | B2* | 1/2007 | Khan | B65B 3/003 141/2 |
| 7,343,943 | B2* | 3/2008 | Khan | B65B 3/003 141/2 |
| 7,610,115 | B2* | 10/2009 | Rob | A61J 1/20 318/568.11 |
| 7,783,383 | B2* | 8/2010 | Eliuk | A61J 1/20 141/1 |
| 7,900,658 | B2* | 3/2011 | Osborne | A61J 1/20 141/104 |
| 7,931,859 | B2* | 4/2011 | Mlodzinski | A61J 1/20 221/123 |
| 8,225,824 | B2* | 7/2012 | Eliuk | B65B 3/003 141/192 |
| 8,267,129 | B2* | 9/2012 | Doherty | A61J 1/2096 141/1 |
| 8,271,138 | B2* | 9/2012 | Eliuk | B66C 1/42 294/902 |
| 8,386,070 | B2* | 2/2013 | Eliuk | A61J 1/20 141/1 |
| 2011/0100501 | A1 | 5/2011 | Mizuno et al. | |
| 2012/0071828 | A1 | 3/2012 | Tojo et al. | |
| 2014/0020790 | A1 | 1/2014 | Yuyama et al. | |

FOREIGN PATENT DOCUMENTS

| | | |
|---|---|---|
| EP | 2298270 | 3/2011 |
| JP | 5093399 B2 | 12/2012 |
| WO | WO 2008/058280 | 5/2008 |
| WO | WO 2012/086144 | 6/2012 |

OTHER PUBLICATIONS

Liu et al., Automated Precise Liquid Dispensing System for Protein Crystallization, 2007, IEEE, p. 3616-3621.*

Japanese Office Action for corresponding JP Application No. 2014-043159, dated Jan. 5, 2016.

Korean Office Action for corresponding KR Application No. 10-2015-0029955, Jun. 22, 2016.

Extended European Search Report for corresponding EP Application No. 15157109.8-1651, Aug. 4, 2015.

Chinese Office Action for corresponding CN Application No. 201510098881.X, Apr. 1, 2017.

* cited by examiner

FLUID TRANSFER APPARATUS, FLUID TRANSFER CONTROL METHOD, FLUID TRANSFER CONTROLLER, FLUID TRANSFER SYSTEM, AND MEDICINE MANUFACTURING METHOD

CROSS-REFERENCE TO RELATED APPLICATION

This application is based upon and claims the benefit of priority from Japanese Patent Application No. 2014-043159, filed Mar. 5, 2014, the entire contents of which are incorporated herein by reference.

BACKGROUND

1. Field

The present disclosure relates to a fluid transfer apparatus, a fluid transfer control method, a fluid transfer controller, a fluid transfer system, and a medicine manufacturing method.

2. Description of the Related Art

WO 2008/058280 A proposes an apparatus which automates a medicine dispensing work.

SUMMARY

The fluid transfer apparatus according to the disclosure includes: a multi-jointed robot configured to transfer a vessel and a syringe; and a syringe driving apparatus, wherein the syringe driving apparatus includes a cylinder body holder configured to hold a cylinder body of the syringe, an actuator configured to pull and push a plunger of the syringe, and a rotation mechanism configured to make the cylinder body holder and the actuator freely rotatable about an axial line intersecting with a center axial line of the syringe.

The fluid transfer control method according to the disclosure which controls the liquid transfer apparatus includes: performing control of the multi-jointed robot so as to dispose the vessel containing a fluid on a lower side of the syringe after making the cylinder body holder hold the cylinder body of the syringe; performing control of the multi-jointed robot so as to make a needle of the syringe puncture the vessel in a state where the vessel is disposed on the lower side of the syringe; performing control of the multi-jointed robot so as to reverse a vertical relation between the vessel and the syringe by rotating the cylinder body holder and the actuator in a state where the needle punctures the vessel; and performing control of the syringe driving apparatus so as to absorb the fluid in the vessel into the syringe by pulling the plunger in a state where the vessel is disposed on an upper side of the syringe.

The fluid transfer controller according to the disclosure which controls the liquid transfer apparatus includes: an arrangement control module configured to control the multi-jointed robot so as to dispose the vessel containing a fluid on a lower side of the syringe after making the cylinder body holder hold the cylinder body of the syringe; a puncture control module configured to control the multi-jointed robot so as to make a needle of the syringe puncture the vessel in a state where the vessel is disposed on the lower side of the syringe; a reverse control module configured to control the multi-jointed robot so as to reverse the vertical relation between the vessel and the syringe by rotating the cylinder body holder and the actuator in a state where the needle punctures the vessel; and a suction control module configured to control the syringe driving apparatus so as to absorb the fluid in the vessel into the syringe by pulling the plunger in a state where the vessel is disposed on an upper side of the syringe.

The fluid transfer system according to the disclosure includes: a multi-jointed robot configured to be capable of transferring a vessel and a syringe; a syringe driving apparatus; and a controller, wherein the syringe driving apparatus includes a cylinder body holder configured to hold a cylinder body of the syringe, an actuator configured to pull and push a plunger of the syringe, and a rotation mechanism configured to make the cylinder body holder and the actuator freely rotatable about an axial line intersecting with a center axial line of the syringe, wherein the controller configured to perform control of the multi-jointed robot so as to dispose the vessel containing a fluid on a lower side of the syringe after making the cylinder body holder hold the cylinder body of the syringe, control of the multi-jointed robot so as to make a needle of the syringe puncture the vessel in a state where the vessel is disposed on the lower side of the syringe, control of the multi-jointed robot so as to reverse a vertical relation between the vessel and the syringe by rotating the cylinder body holder and the actuator in a state where the needle punctures the vessel, and control of the syringe driving apparatus so as to absorb the fluid in the vessel into the syringe by pulling the plunger in a state where the vessel is disposed on an upper side of the syringe.

A medicine manufacturing method of manufacturing a medicine by controlling the fluid transfer apparatus according to the disclosure, includes: performing control of the multi-jointed robot so as to dispose a first vessel containing a raw liquid of the medicine on a lower side of the syringe after making the cylinder body holder hold the cylinder body of the syringe; performing control of the multi-jointed robot so as to make a needle of the syringe puncture the first vessel in a state where the first vessel is disposed on the lower side of the syringe; performing control of the multi-jointed robot so as to reverse a vertical relation between the first vessel and the syringe by rotating the cylinder body holder and the actuator in a state where the needle punctures the first vessel; performing control of the syringe driving apparatus so as to absorb the raw liquid medicine in the first vessel into the syringe by pulling the plunger in a state where the first vessel is disposed on an upper side of the syringe; performing control of the multi-jointed robot so as to remove the needle from the first vessel; performing control of the multi-jointed robot so as to make the needle face the lower side by rotating the cylinder body holder and the actuator in a state where the needle is removed from the first vessel; performing control of the multi-jointed robot so as to dispose a second vessel for the medicine on the lower side of the syringe; performing control of the multi-jointed robot so as to make the needle puncture the second vessel in a state where the second vessel is disposed on the lower side of the syringe; and performing control of the syringe driving apparatus so as to inject the raw liquid medicine in the syringe into the second vessel by pushing the plunger.

DETAILED DESCRIPTION

Hereinafter, embodiments will be described in detail with reference to the drawings. In the description, the same elements or the elements having the same function will be denoted with the same symbols, and the descriptions thereof will not be repeated.

First Embodiment

Medicine Manufacturing System

Figure 1:
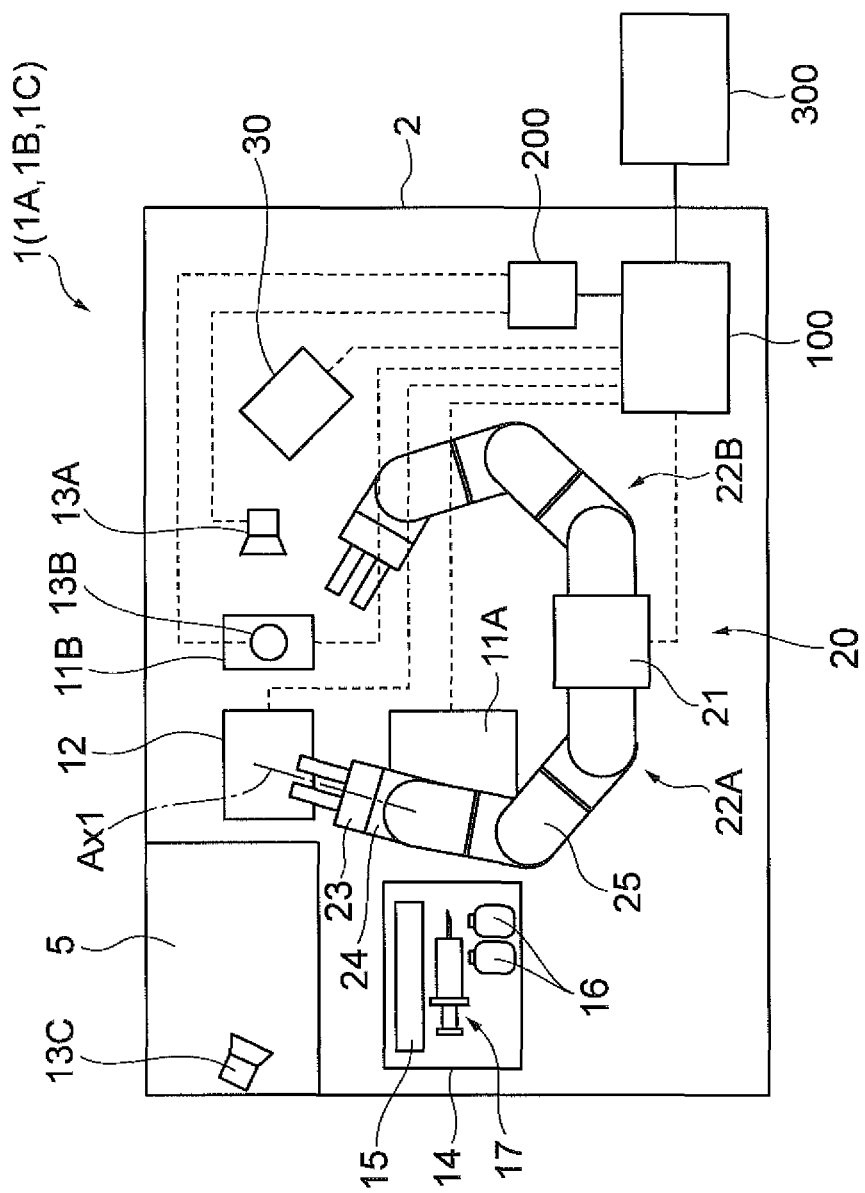
FIG. 1 is a top view illustrating the outline of a medicine manufacturing system according to a first embodiment.
Figure 2:
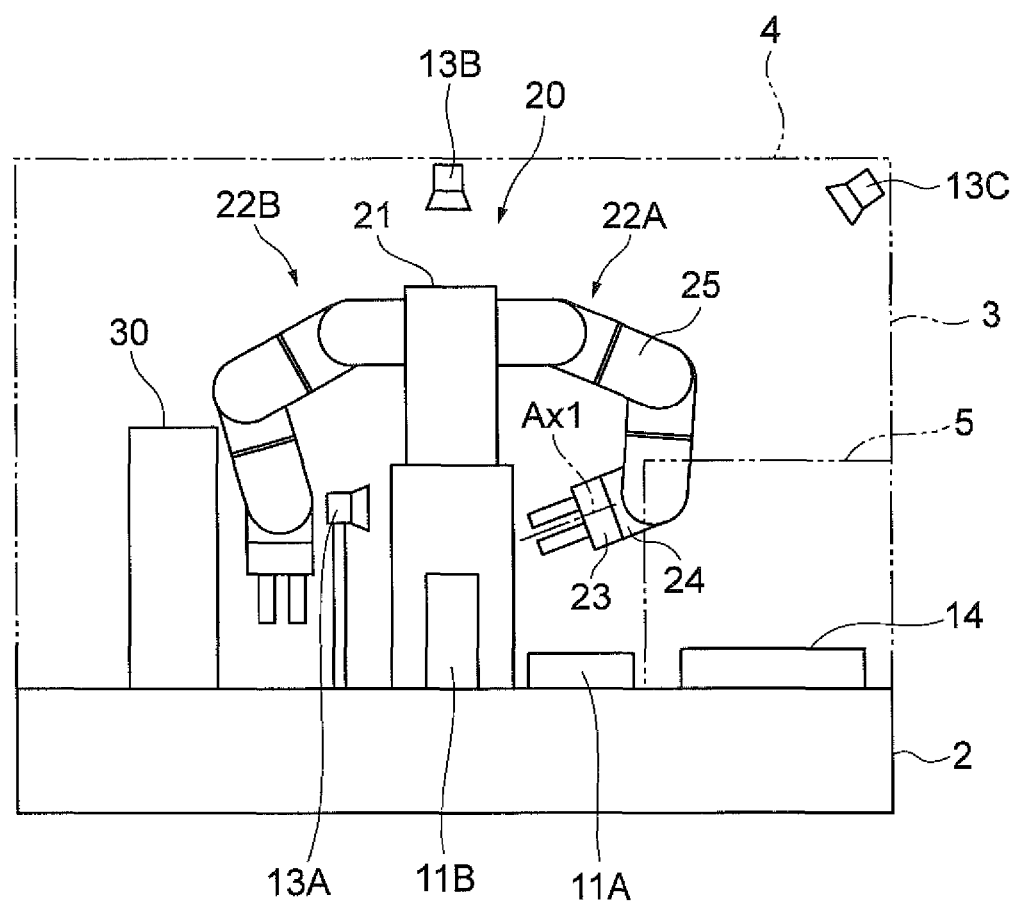
FIG. 2 is a front view illustrating the outline of the medicine manufacturing system according to the first embodiment.

As illustrated in FIGS. 1 and 2, a medicine manufacturing system 1 (a robot system) mixes a plurality of raw medicines to manufacture a medicine such as an anticancer agent for example. The medicine manufacturing system 1 includes a fluid transfer apparatus 10, a controller 100, an image processing apparatus 200, and a management computer 300. The medicine manufacturing system 1 serves as a fluid transfer system 1A which transfers a fluid in process of manufacturing a medicine. A transfer target fluid may be a liquid, or may be a gas.

The fluid transfer apparatus 10 includes a work table 2, a multi-jointed robot 20, a syringe driving apparatus 30, metering apparatuses 11A and 11B, an agitating apparatus 12, and cameras 13A, 13B, and 13C. The work table 2 supports the respective apparatuses forming the medicine manufacturing system 1. The work table 2, for example, is formed in a rectangular and planar shape. "Front," "rear," "right," and "left" in the following description are used to mean a direction such that a long side of the work table 2 is a front side and another long side is a rear side.

The upper space of the work table 2 is separated from the external space by a side wall 3 and a tabletop 4. At the corner on the left front side of the work table 2, a port 5 is provided to carry in and out a work object through the side wall 3. The work object, for example, is a tray 14 in which a liquid medicine bag 15, a plurality of vials 16, and a syringe 17 are placed.

The liquid medicine bag 15 is a vessel (a second vessel for a medicine) which contains a medicine. The liquid medicine bag 15, for example, includes a block material and a bag which is held in the block material.

The vial 16 is a vessel (a first vessel) which contains a raw medicine. The vial 16 includes a bottle 16a and a cap 16c (see FIGS. 7 to 9). The bottle 16a includes a narrowed mouth 16b, and contains a raw medicine. The cap 16c closes the mouth 16b. At least the center portion of the cap 16c is made of a material (for example, a rubber material) which can be punctured by a needle.

Figure 7:
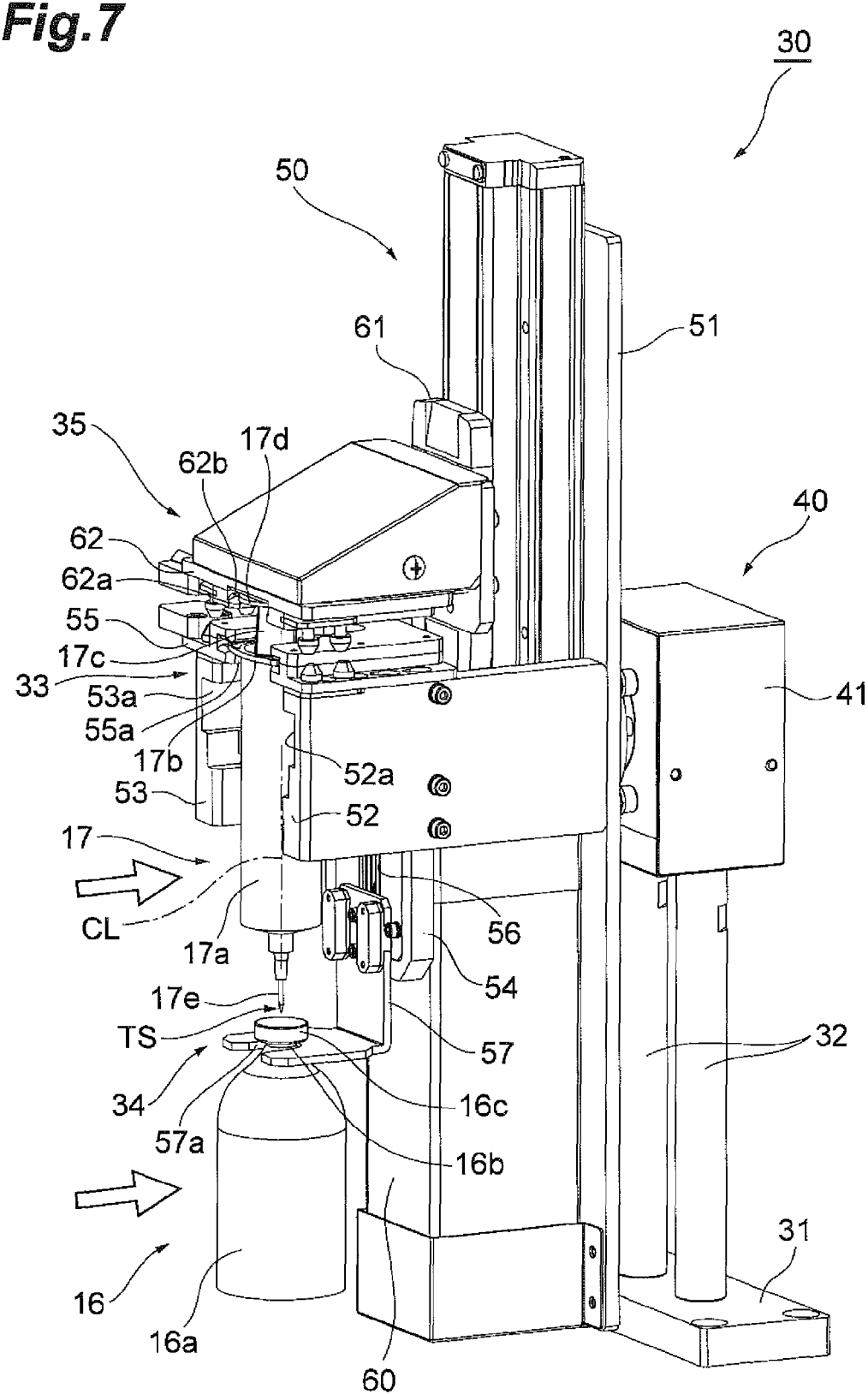
FIG. 7 is a perspective view illustrating a state where a vial and a syringe are mounted in the syringe driving apparatus of FIG. 3.
Figure 8:
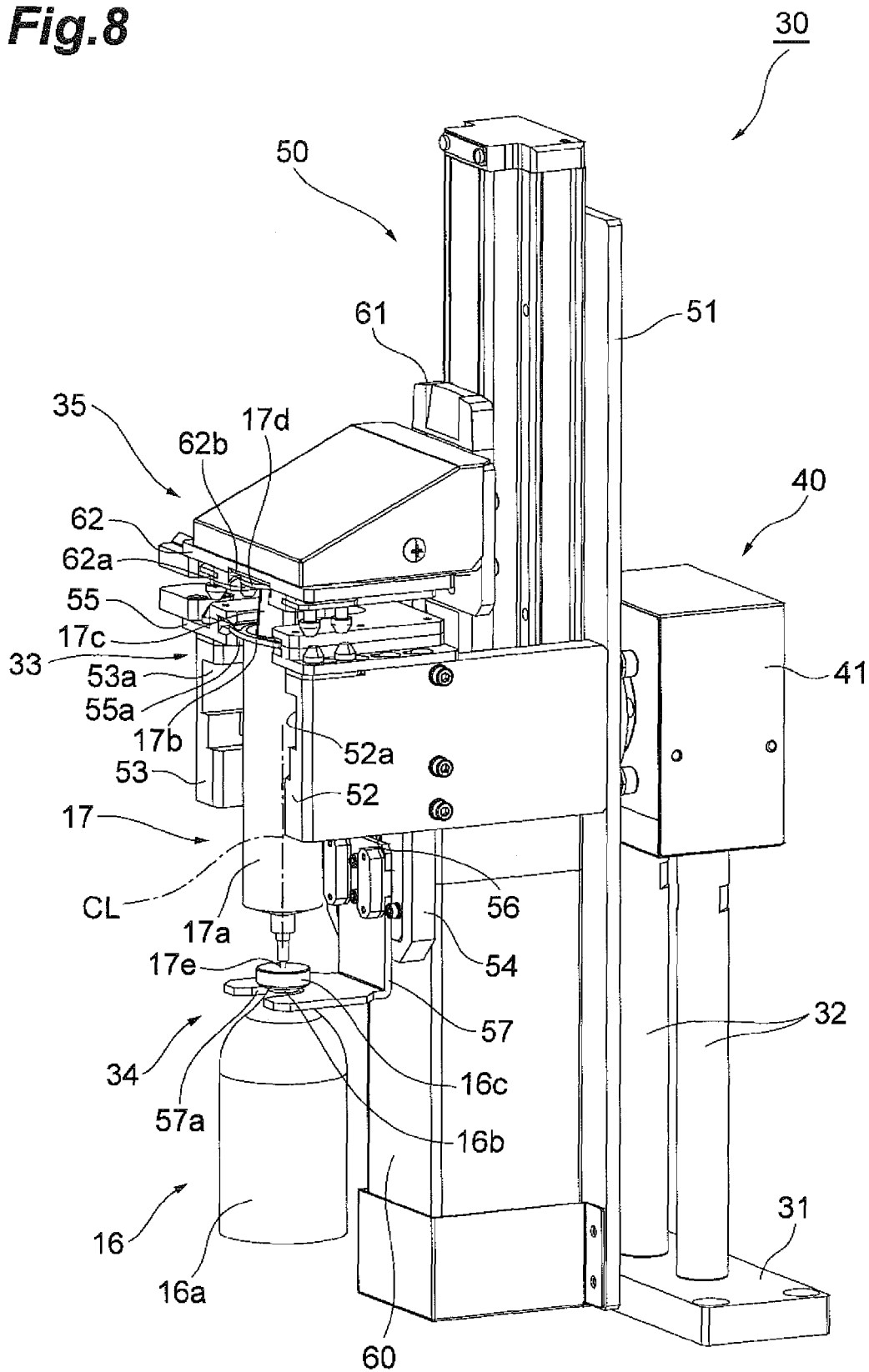
FIG. 8 is a perspective view illustrating a state where a needle of the syringe punctures the vial in FIG. 7.
Figure 9:
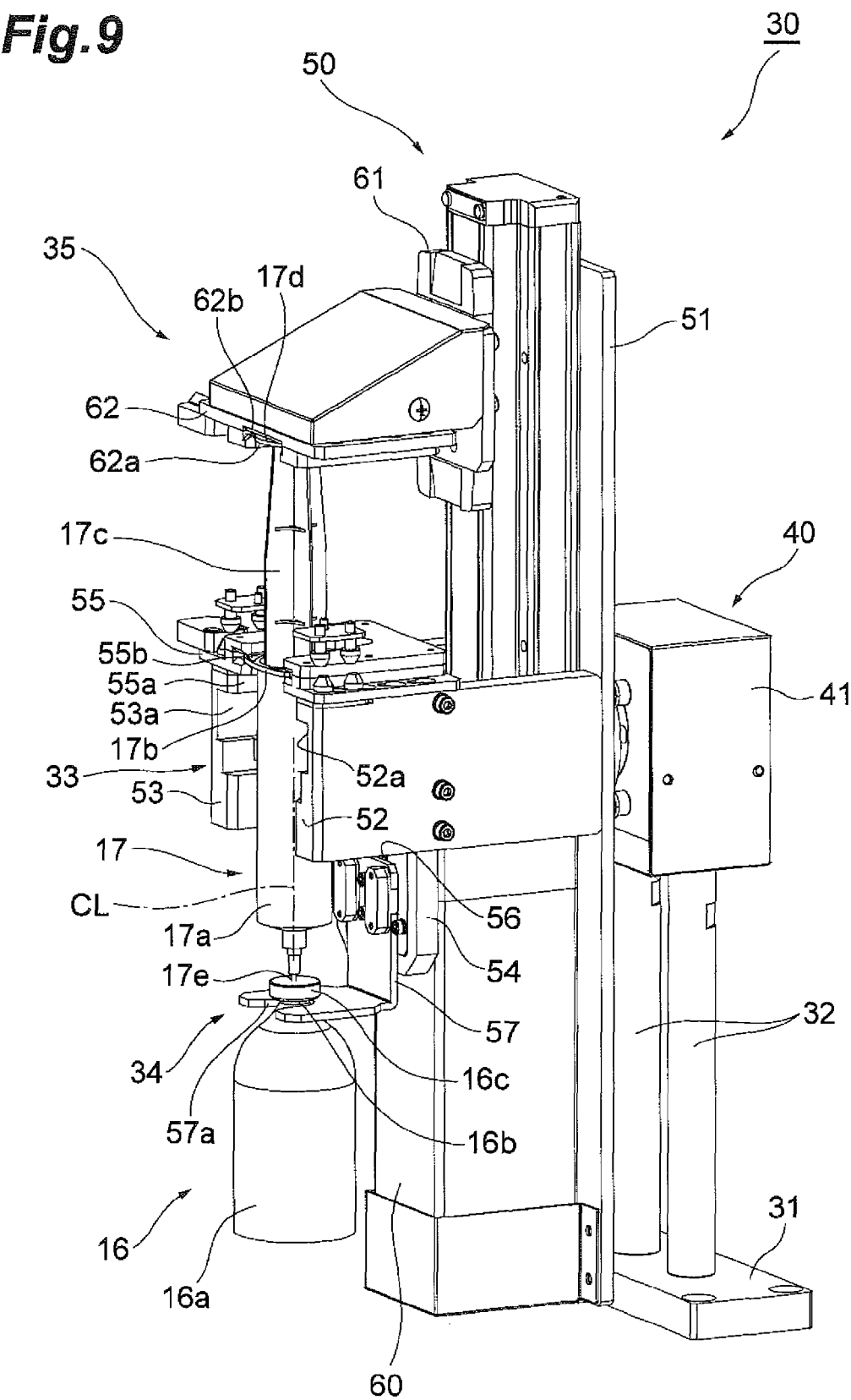
FIG. 9 is a perspective view illustrating a state where a plunger of the syringe is pulled in FIG. 7.

The syringe 17 includes a cylinder body 17a, a plunger 17c, and a needle 17e which is provided in a tip portion of the cylinder body 17a (see FIGS. 7 to 9). A flange 17b is formed in an outer peripheral of a base portion of the cylinder body 17a. A flange 17d is formed in an outer peripheral of the base portion of the plunger 17c. The tip portion of the needle 17e has a tilted surface TS which is inclined with respect to an extending direction of the needle. With this configuration, the tip portion of the needle 17e is formed to have a taper shape. Therefore, a puncture target (the center portion of the cap 16c in this embodiment) is easily punctured by the needle 17e.

The multi-jointed robot 20 is provided on the work table 2. The multi-jointed robot 20 is a double-arm robot which includes a body part 21 and two multi-jointed arms 22A and 22B. The multi-jointed robot 20 can perform various types of work including transfer of the liquid medicine bag 15, the vial 16, and the syringe 17. The body part 21 is fixed on the work table 2. The body part 21 is positioned near the center of the work table 2 in a right and left direction, and shifted to the read side of the work table 2 in a front and rear direction. The multi-jointed arm 22A is provided on the left side of the body part 21. The multi-jointed arm 22B is provided on the right side of the body part 21.

Each of the multi-jointed arms 22A and 22B includes a gripper 23, a wrist portion 24, and a limb portion 25. The gripper 23 includes a pair of finger portions 23a and 23b. The gripper 23 grips the liquid medicine bag 15, the vial 16, or the syringe 17 by opening or closing the finger portions 23a and 23b. The wrist portion 24 holds the gripper 23, and rotates the gripper 23 about a rotation center Ax1 according to the supply of energy such as electric power. The limb portion 25 is interposed between the body part 21 and the wrist portion 24. The limb portion 25, for example, is a multi-jointed serial link mechanical. The limb portion 25 moves the wrist portion 24 according to the supply of energy such as electric power.

Figure 3:
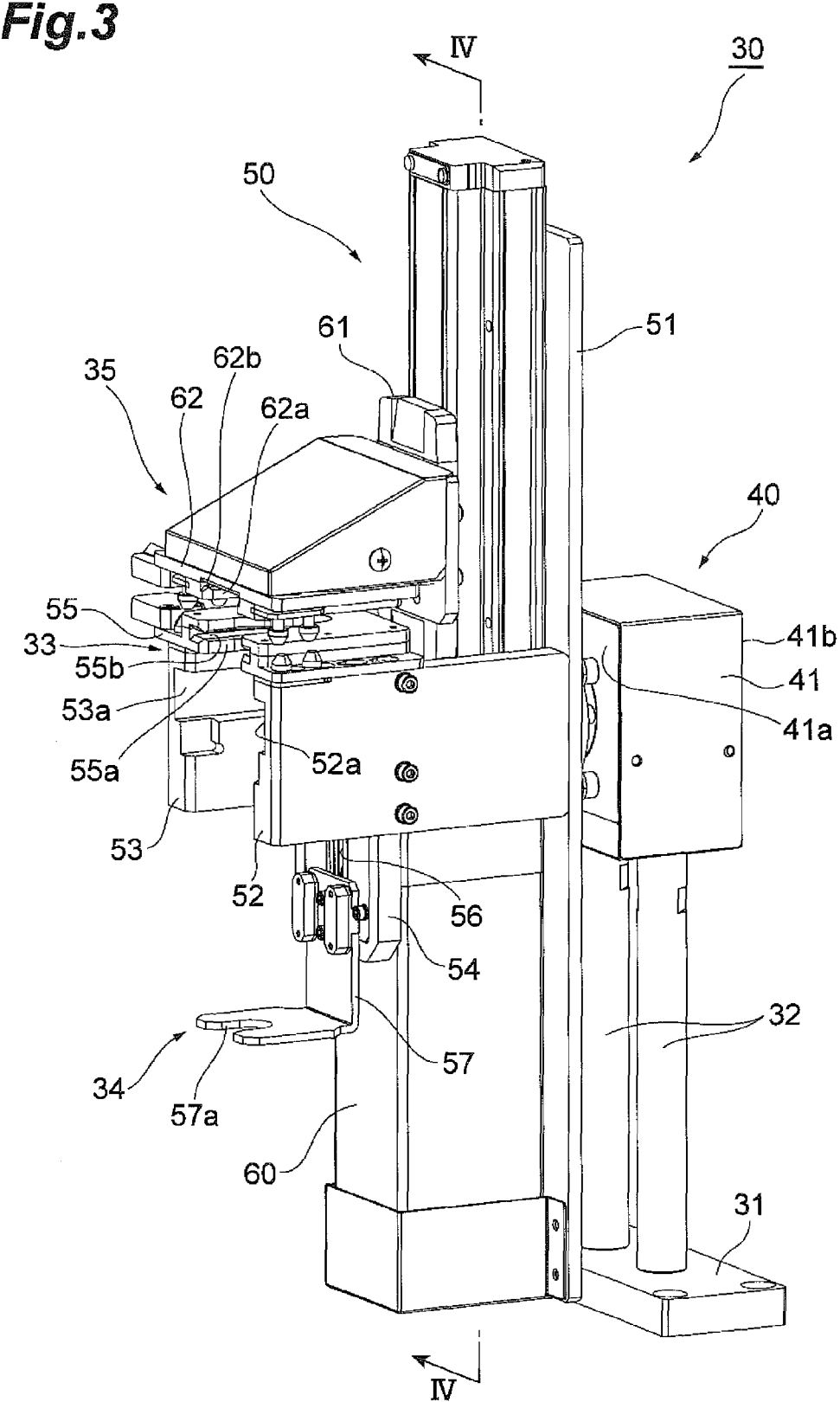
FIG. 3 is a perspective view of a syringe driving apparatus.
Figure 4:
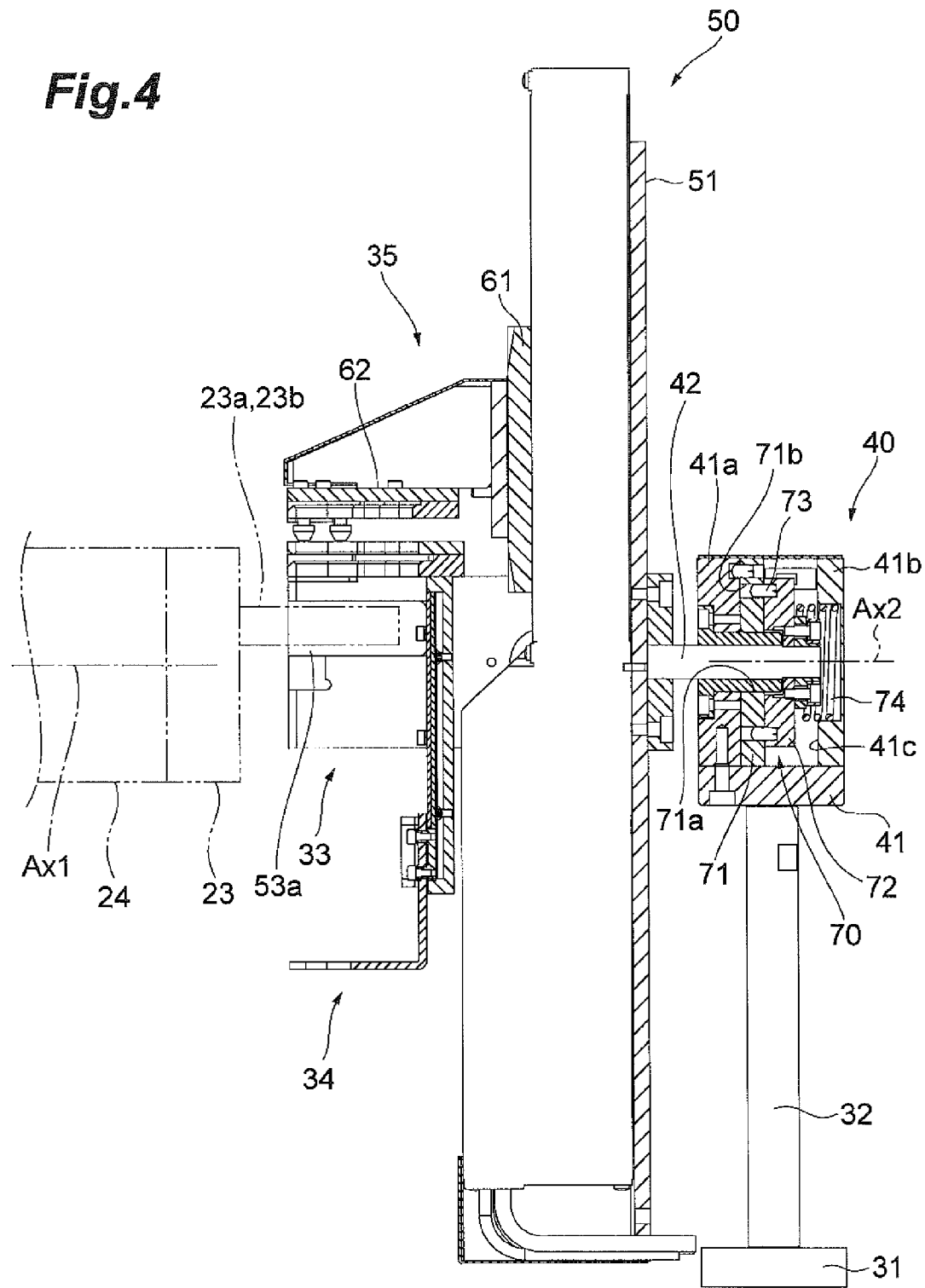
FIG. 4 is a cross-sectional view taken along line IV-IV in FIG. 3.

As illustrated in FIGS. 3 and 4, the syringe driving apparatus 30 includes a rotation mechanism 40 and a rotation unit 50. The rotation mechanism 40 is supported by a stationary plate 31 fixed on the work table 2 and a supporting post 32 erected on the stationary plate 31. The stationary plate 31 is positioned on the right front side of the multi-jointed robot 20. The arrangement is not essential but only an example.

The rotation mechanism 40 includes a case 41 and a rotation shaft 42. The case 41 includes walls 41a and 41b facing to each other in the horizontal direction and a space 41c partitioned by the walls 41a and 41b. The wall 41a faces the multi-jointed robot 20. The rotation shaft 42 is formed to pass through the wall 41a, and freely rotates about a rotation center Ax2. One end (hereinafter, referred to as an "outer end") of the rotation shaft 42 is exposed toward the multi-jointed robot 20. The other end (hereinafter, referred to as an "inner end") of the rotation shaft 42 is positioned in the space 41c.

The rotation unit 50 includes a base plate 51, holding plates 52 and 53, a partitioning plate 54, and a linear actuator 60. The base plate 51 is formed in a lengthy planar shape, and is fixed to the outer end of the rotation shaft 42 in a state where the base plate 51 is perpendicular to the rotation center Ax2.

The holding plates 52 and 53 protrude toward the multi-jointed robot 20 from the surface (the surface on a side near the multi-jointed robot 20) of the base plate 51 in a state where these plates face to each other in the width direction of the base plate 51.

In the inner surface (the surface on a side near the holding plate 53) of the holding plate 52, an engaging groove 52a is formed along the rotation center Ax2. One end of the engaging groove 52a is open toward the multi-jointed robot 20. In the inner surface (the surface on a side near the holding plate 52) of the holding plate 53, an engaging groove 53a facing the engaging groove 52a is formed. The engaging groove 53a is also extended along the rotation center Ax2. One end of the engaging groove 53a is open toward the multi-jointed robot 20.

Figure 5:
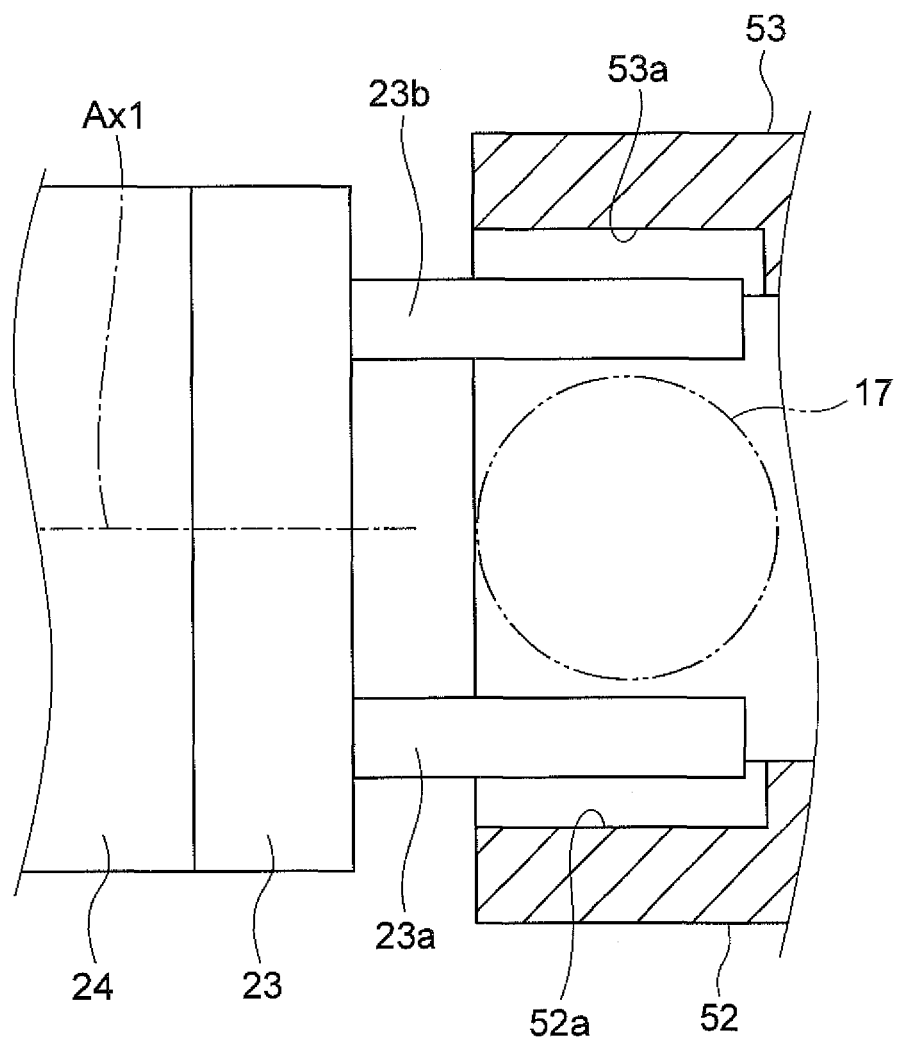
FIG. 5 is an enlarged view of a holding plate and a gripper.
Figure 6:
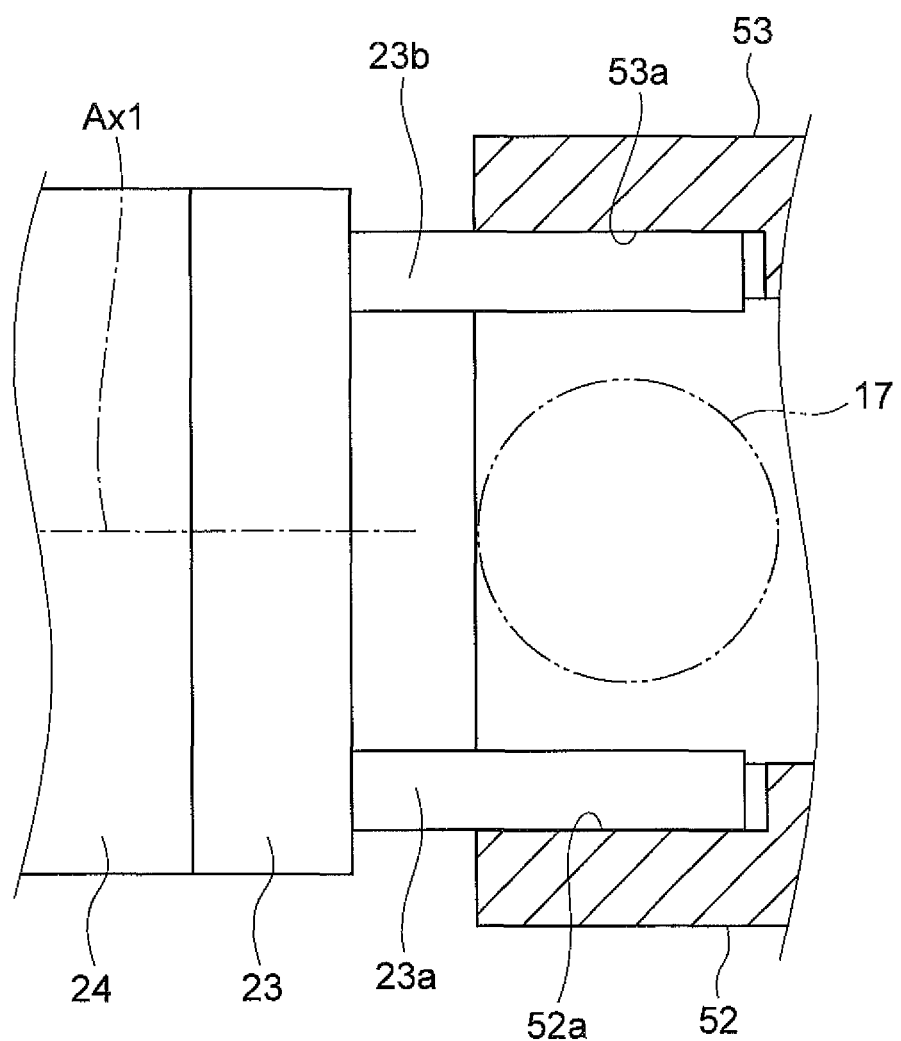
FIG. 6 is an enlarged view of the holding plate and the gripper.

The engaging grooves 52a and 53a are used as an engaging portion to be engaged with the gripper 23. Specifically, the finger portions 23a and 23b of the gripper 23 are inserted between the holding plates 52 and 53, and disposed to correspond to the engaging grooves 52a and 53a, respectively (see FIG. 5). In this state, the finger portions 23a and 23b are separated from each other, and engaged with the engaging grooves 52a and 53a, respectively (see FIG. 6). In a state where the finger portions 23a and 23b and the engaging grooves 52a and 53a are engaged to each other, the rotation center Ax1 of the gripper 23 and the rotation center Ax2 of the rotation mechanism 40 are matched (see FIG. 4). In other words, the engaging grooves 52a and 53a are configured to be engaged with the gripper 23 in a state where the rotation center Ax1 of the gripper 23 and the rotation center Ax2 of the rotation mechanism 40 are matched.

The partitioning plate 54 is formed in a planar shape. The partitioning plate 54 is fixed between the holding plates 52 and 53 in parallel with the base plate 51. The partitioning plate 54 is extended downwardly from a portion between the holding plates 52 and 53. The partitioning plate 54 partitions the portion between the holding plates 52 and 53 into the space on a side near the base plate 51 and the space on a side near the multi-jointed robot 20.

On one end side of the base plate 51, a flange holding member 55 of a planar shape is suspended on the holding plates 52 and 53. The flange holding member 55 is shifted toward the multi-jointed robot 20 on the holding plates 52 and 53. In the flange holding member 55, the notch 55a is formed. The notch 55a is formed in a U shape which is open toward the multi-jointed robot 20. In the side surface of the notch 55a, a groove 55b is formed to be extended along the U shape. The groove 55b is open toward the multi-jointed robot 20 in both U-shape end portions.

The holding plates 52 and 53 and the flange holding member 55 are used to hold the cylinder body 17a of the syringe 17. In other word, the holding plates 52 and 53 and the flange holding member 55 form a cylinder body holder 33 which holds the cylinder body 17a of the syringe 17. Specifically, the syringe 17 is put between the holding plates 52 and 53 from the multi-jointed robot 20 side in a state where the tip portion of the cylinder body 17a faces the opposite side of the flange holding member 55 (see FIG. 7). At this time, the flange 17b of the cylinder body 17a is fitted to the groove 55b. Therefore, the cylinder body 17a is held.

A rail 56 is provided in the surface (the surface on a side near the multi-jointed robot 20) of the partitioning plate 54. The rail 56 is positioned in the center in the width direction of the partitioning plate 54, and extended in a lengthwise direction of the partitioning plate 54.

On the rail 56, a holding plate 57 bent in an L shape is attached. In the holding plate 57, the plate portion forming a part of the L shape is disposed to face the surface of the partitioning plate 54. The plate portion can be configured to move along the rail 56. The plate portion, for example, is attracted to the surface of the partitioning plate 54 by a magnetic force (an attractive force) generated between the partitioning plate 54 and the holding plate 57. The holding plate 57 is fixed by a frictional force with respect to the partitioning plate 54, but the holding plate 57 can be shifted from its position in a direction along the rail 56 by applying an external force exceeding the frictional force to the holding plate 57. In the holding plate 57, the other plate portion forming the L shape is positioned on the opposite side of the flange holding member 55. The plate portion protrudes toward the multi-jointed robot 20. In the plate portion protruding toward the multi-jointed robot 20, the U-shaped notch 57a is formed to be open toward the multi-jointed robot 20.

The notch 57a is used to hold the vial 16. In other words, the holding plate 57 is configured to form a vial holding portion 34 which holds the vial 16. Specifically, in a state where the cap 16c is disposed on a side near the flange holding member 55 and the bottle 16a is disposed on a side opposite to the flange holding member 55, the mouth 16b is fitted into the notch 57a (see FIG. 7). The vial 16 is held such that a peripheral edge portion of the notch 57a is fitted to the narrow portion of the mouth 16b. As described above, it is possible to shift the position of the holding plate 57 in a direction along the rail 56 by applying a force against the frictional force between the holding plate 57 and the partitioning plate 54 to the holding plate 57. Therefore, it is possible to shift the position of the vial 16 together with the holding plate 57, and the needle 17e can be punctured or removed with respect to the cap 16c (see FIG. 8). In addition, it is possible to adjust an inserting length of the needle 17e with respect to the cap 16c.

The linear actuator 60 is formed in a lengthy shape. The linear actuator 60 includes the slide block 61 which is movable along the lengthwise direction. The linear actuator 60 is disposed along the base plate 51 between the base plate 51 and the partitioning plate 54. The linear actuator 60 is fixed to the base plate 51. The slide block 61 is disposed on a side near the multi-jointed robot 20.

The slide block 61 is provided with a flange holding member 62 which protrudes toward the multi-jointed robot 20. The flange holding member 62 faces the outside surface (the surface on a side opposite to the holding plates 52 and 53) of the flange holding member 55. A concave portion 62a is formed in the surface on a side near the flange holding member 55 of the flange holding member 62. The concave portion 62a is formed at a position corresponding to the notch 55a, and is formed in the U shape which is open toward the multi-jointed robot 20. In the side surface of the concave portion 62*a*, a groove 62*b* is formed to be extended along the U shape. The groove 62*b* is open toward the multi-jointed robot 20 on both end sides of the U shape.

The flange holding member 62 is used to hold the plunger 17*c* of the syringe 17. Specifically, when the flange 17*b* of the cylinder body 17*a* is fitted to the groove 55*b*, the flange 17*d* of the plunger 17*c* is fitted to the groove 62*b*. With this configuration, the plunger 17*c* is held. The linear actuator 60 moves the slide block 61 in a state where the plunger 17*c* is held in the flange holding member 62 (see FIG. 9). With this configuration, the plunger 17*c* is pulled and pushed. In other words, the linear actuator 60 serves as an actuator 35 which pulls and pushes the plunger 17*c* of the syringe 17.

Figure 10:
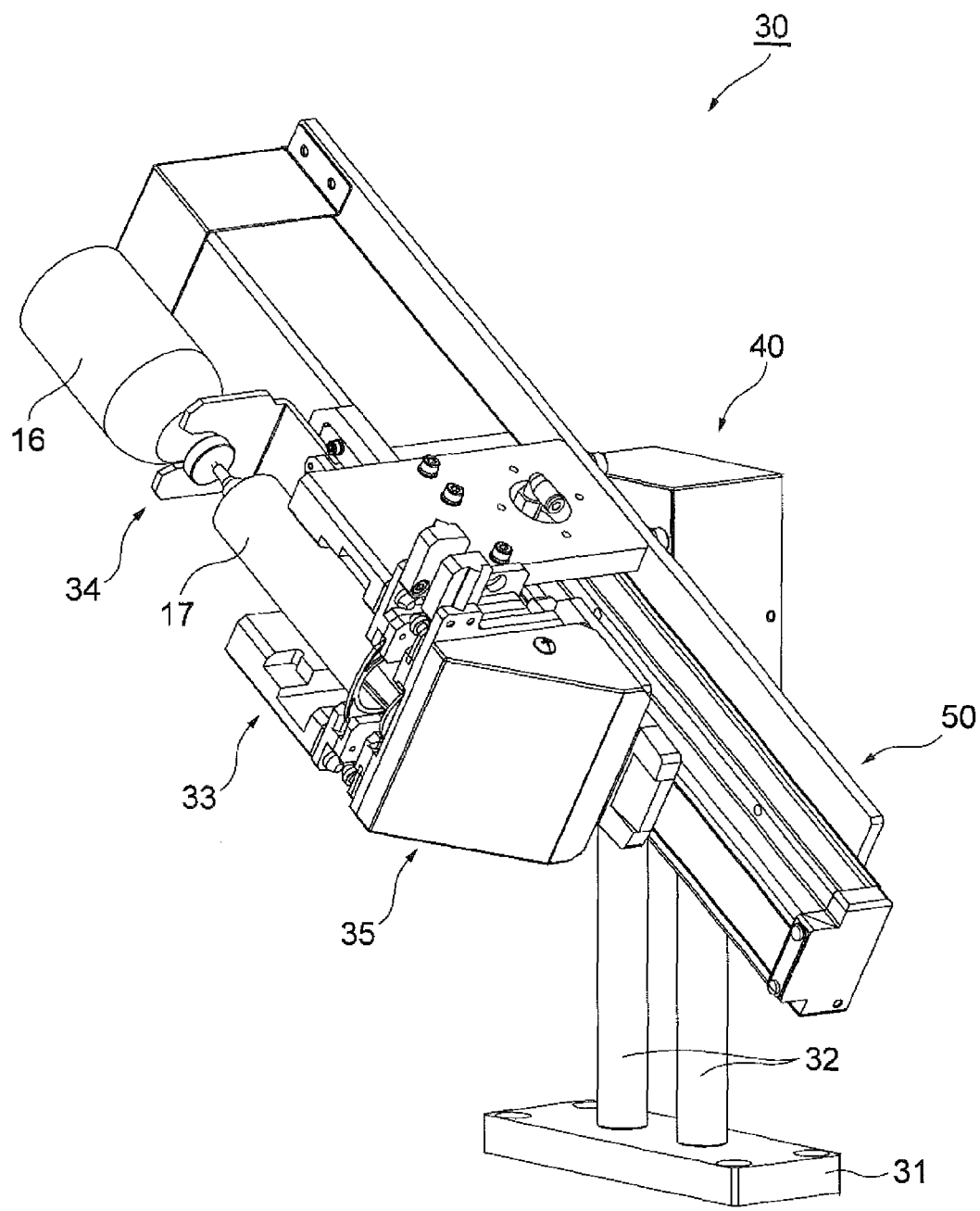
FIG. 10 is a perspective view illustrating a state where a rotation unit is rotated in FIG. 8.

Therefore, the cylinder body holder 33, the vial holding portion 34, and the actuator 35 are provided in the rotation unit 50. As described above, since the base plate 51 of the rotation unit 50 is fixed to the rotation shaft 42 of the rotation mechanism 40, the rotation unit 50 is freely rotated together with the rotation shaft 42 (see FIG. 10). In a state where the cylinder body 17*a* of the syringe 17 is held by the cylinder body holder 33, the rotation center Ax2 of the rotation shaft 42 is perpendicular to a center axial line CL of the syringe 17 (see FIGS. 7 to 9). In other words, the rotation mechanism 40 serves to make the cylinder body holder 33, the vial holding portion 34, and the actuator 35 freely rotatable about the axial line perpendicular to the center axial line CL. With this rotation, it is possible to reverse a vertical relation between the vial 16 and the syringe 17. Further, the perpendicular arrangement is not essential, but at least the rotation center Ax2 and the center axial line CL may intersect.

Figure 11:
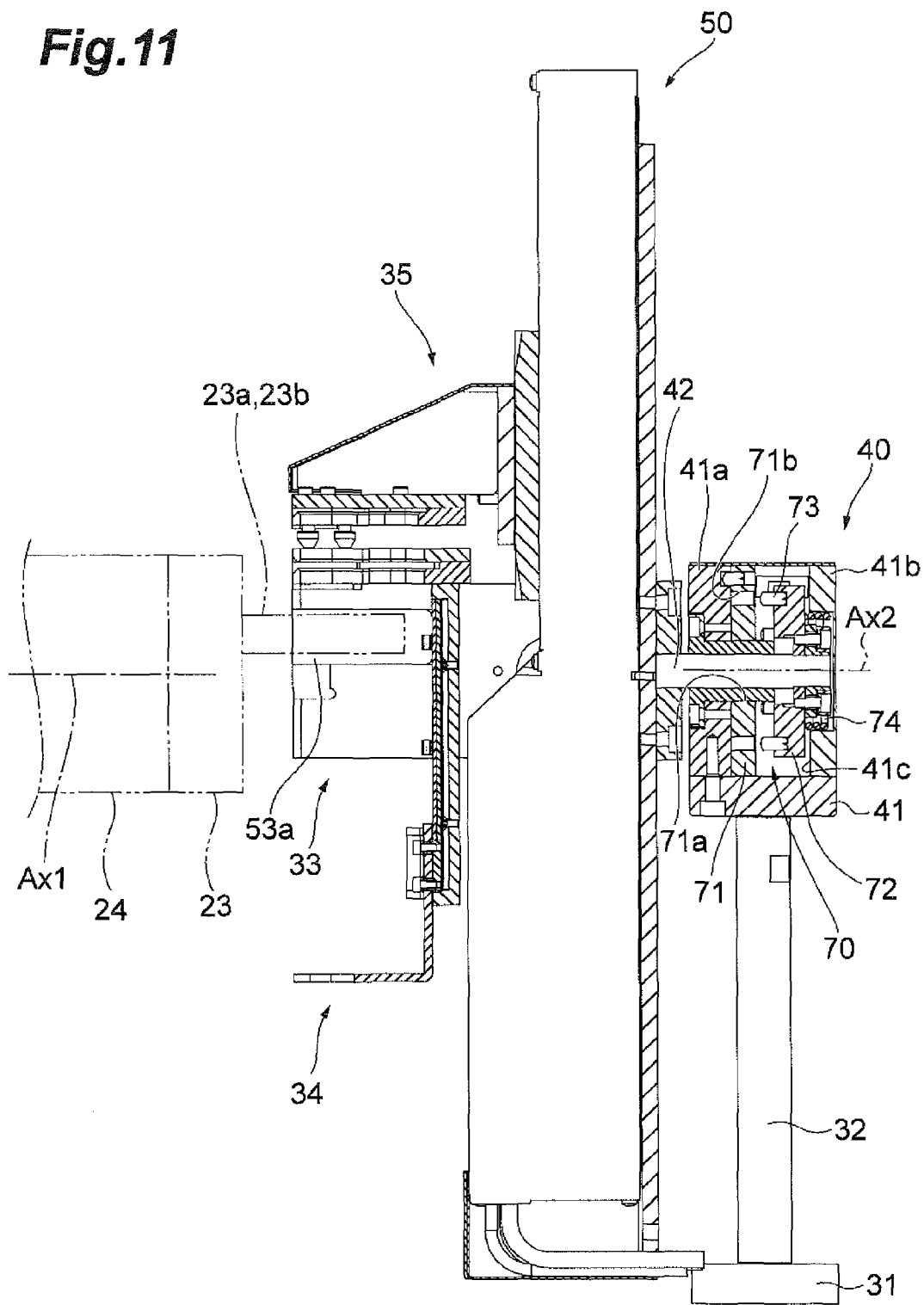
FIG. 11 is a cross-sectional view illustrating a state where the state of a lock mechanism in FIG. 4 is switched from a regulating state to an allowing state.

A lock mechanism 70 which switches an allowing state for allowing the rotation of the rotation shaft 42 and a regulating state for regulating the rotation of the rotation shaft 42 is provided in the space 41*c* in the rotation mechanism 40 (see FIGS. 4 and 11). In other words, the lock mechanism 70 switches the allowing state for allowing the rotation of the rotation unit 50 (the cylinder body holder 33, the vial holding portion 34, and the actuator 35) and the regulating state for regulating the rotation of these components.

The lock mechanism 70 includes lock plates 71 and 72 and an elastic member 74. The lock plate 71 includes a center hole 71*a* which passes through the rotation shaft 42. The lock plate 71 is fixed to the wall 41*a*. In the lock plate 71, a plurality of lock holes 71*b* are formed to be disposed to surround the center hole 71*a*. The lock plate 72 is fixed to an outer peripheral of the rotation shaft 42 between the lock plate 71 and the wall 41*b*. The lock plate 72 faces the lock plate 71. In the lock plate 72, a plurality of lock pins 73 are inserted and fixed (see FIG. 4). These lock pins 73 surround the rotation shaft 42 and protrude toward each lock plate 71. The elastic member 74, for example, is a coil spring. The elastic member 74 is disposed in a compressed state between the lock plate 72 and the wall 41*b*. Further, the elastic member 74 is not limited to the coil spring, and may be a plate spring for example.

The lock plate 72 is pushed to the lock plate 71 by a repulsive force of the elastic member 74, and the lock pins 73 are fitted in the lock hole 71*b*. With this configuration, a relational rotation between the lock plate 71 and the lock plate 72 is regulated. In other words, when the rotation unit 50 moves away from the rotation mechanism 40 by the repulsive force of the elastic member 74, it enters the regulating state. When the rotation shaft 42 is pushed into the case 41 against the repulsive force of the elastic member 74, the lock plate 72 moves away from the lock plate 71, and the lock pins 73 go out of the lock plate 71 (see FIG. 11). With this configuration, the lock plate 71 and the lock plate 72 rotate freely to each other. In other words, when the rotation unit 50 approaches the rotation mechanism 40 against the repulsive force of the elastic member 74, it enters the allowing state. With this configuration, the lock mechanism 70 is switched between the allowing state and the regulating state according to the movement of the rotation unit 50 along the rotation center Ax2 of the rotation mechanism 40.

The metering apparatuses 11A and 11B illustrated in FIGS. 1 and 2, for example, are electronic force balances. The metering apparatus 11A for example, is disposed on the left front side of the body part 21. The metering apparatus 11A is used to meter the liquid medicine bag 15 or the vial 16. The metering apparatus 11B, for example, is disposed on the front side of the body part 21. The metering apparatus 11B is used to meter the syringe 17.

The agitating apparatus 12, for example, is an apparatus to agitate contents by adding oscillation to the vial 16 (see FIG. 1). Further, a method of agitating the contents of the vial 16 is not limited to the oscillation method.

The cameras 13A and 13B, for example, are disposed on the right side and the upper side of the metering apparatus 11B, respectively. The cameras 13A and 13B take images of the syringe 17 which is provided on the metering apparatus 11B (see FIGS. 1 and 2). The images taken by the cameras 13A and 13B are used for an image process of the image processing apparatus 200. The camera 13C is disposed in the upper portion in the side wall 3. The camera 13C takes an image of a work area of the multi-jointed robot 20 (see FIG. 2). The image taken by the camera 13C is used to record a work execution state of the multi-jointed robot 20.

The controller 100 performs control of the multi-jointed robot 20 and the syringe driving apparatus 30. The image processing apparatus 200, for example, performs an image process of recognizing a direction of the surface of the tip portion (the tilted surface TS of the needle tip) of the needle 17*e* using the images taken by the cameras 13A and 13B. The management computer 300, for example, generates a control pattern of the multi-jointed robot 20 and the syringe driving apparatus 30 according to the type of a manufacturing medicine, and transmits the control pattern to the controller 100. In addition, the management computer 300 records the metering results of the metering apparatuses 11A and 11B, the image taken by the camera 13C, and the like as an execution history of a medicine manufacturing process. Further, the controller 100, the image processing apparatus 200, and the management computer 300 are not necessarily separated from each other, but may be integrally formed.

According to the fluid transfer system 1A, as described below, a transfer work of the fluid from the vial 16 to the syringe 17 can be automated by appropriately combining control of the multi-jointed robot 20 such that the cylinder body 17*a* of the syringe 17 is held in the cylinder body holder 33 and the needle 17*e* of the syringe 17 punctures the vial 16, control of the syringe driving apparatus 30 so as to pull out the plunger 17*c*, and control of the multi-jointed robot 20 such that the syringe 17 and the vial 16 are adjusted in arrangement by rotating the rotation unit 50.

The multi-jointed robot 20 can perform a plurality types of work together with the transfer work of the fluid. It is possible to suppress an increase in size of a facility (the medicine manufacturing system 1) by causing the multi-jointed robot 20 to perform the plurality types of work. In the transfer work of the fluid, since the pulling and pushing of the plunger 17*c* is performed by the syringe driving apparatus 30, there is no need to provide the actuator in the multi-jointed robot 20 for the pulling and pushing of the plunger 17c. Therefore, an end effector (the gripper 23) of the multi-jointed robot 20 can be made small in size. Through the miniaturization of the end effector, it is possible to suppress an increase in size of a work space of the multi-jointed robot 20. On the other hand, it is possible to miniaturize the syringe driving apparatus 30 by adapting it to specialize in pulling and pushing the plunger 17c, and curb any size increase in the space required to install it. Therefore, the fluid transfer work can be automated while suppressing an increase in size of the facility.

The rotation mechanism 40 includes the lock mechanism 70 which switches the allowing state for allowing the rotation of the rotation unit 50 and the regulating state for regulating the rotation of the rotation unit 50. Therefore, the arrangement of the syringe 17 and the vial 16 can be stabilized and an accuracy of the fluid transfer work can be improved by setting the lock mechanism 70 to the regulating state except during a period when the rotation unit 50 is rotated by the multi-jointed robot 20. However, the lock mechanism 70 is not essential.

The lock mechanism 70 switches the allowing state and the regulating state according to the movement of the rotation unit 50 along the rotation center Ax2 of the rotation mechanism 40. Therefore, the allowing state and the regulating state can be easily switched using the multi-jointed robot 20. Specifically, the allowing state and the regulating state can be switched only by controlling the multi-jointed robot 20 such that the rotation unit 50 moves along the rotation center Ax2. The lock mechanism 70 can be made small by utilizing the multi-jointed robot 20 even in switching the allowing state and the regulating state. However, it is not essential that the lock mechanism 70 is configured to switch the allowing state and the regulating state according to the movement of the rotation unit 50 along the rotation center Ax2 of the rotation mechanism 40.

The rotation mechanism 40 includes the engaging grooves 52a and 53a which are engaged with the gripper 23 in a state where the rotation center Ax1 of the gripper 23 and the rotation center Ax2 of the rotation mechanism 40 are matched. Therefore, the rotation unit 50 can be rotated by rotating the gripper 23 after the gripper 23 is engaged with the engaging grooves 52a and 53a. Since the rotation unit 50 can be rotated only by one axis for rotating the gripper 23, control of the multi-jointed robot 20 can be simplified. In addition, it is possible to reduce the work space of the multi-jointed robot 20 which is necessary for rotating the rotation unit 50. However, the engaging grooves 52a and 53a are not essential.

The multi-jointed robot 20 is the double-arm robot which includes two multi-jointed arms 22A and 22B. With this configuration, more various types of work can be performed by the multi-jointed robot 20. Therefore, since the apparatuses other than the multi-jointed robot 20 can be eliminated while making the multi-jointed robot 20 used in the various types of work, it is possible to more suppress an increase in size of the facility. However, it is not essential that the multi-jointed robot is a double-arm type.

Further, the lock mechanism 70 may switch the allowing state and the regulating state by an electromagnetic brake.

The syringe driving apparatus 30 may have no vial holding portion 34. In this case, the vial 16 is necessarily held by any one of the multi-jointed arms 22A and 22B instead of the vial holding portion 34. In addition, when the vertical relation between the vial 16 and the syringe 17 is reversed, the multi-jointed robot 20 is necessarily controlled to make the vial 16 follow the rotation of the rotation unit 50.

The syringe driving apparatus may be provided in the gripper 23. In this case, since the orientation of the syringe 17 can be freely adjusted by changing the orientation of the gripper 23, the configuration corresponding to the rotation mechanism 40 can be eliminated.

The controller 100 may control any one of the multi-jointed arms 22A and 22B as the syringe driving apparatus. In this case, since the apparatuses other than the multi-jointed robot 20 can be more eliminated, it is possible to more suppress an increase in size of the facility.

(Controller)

Figure 12:
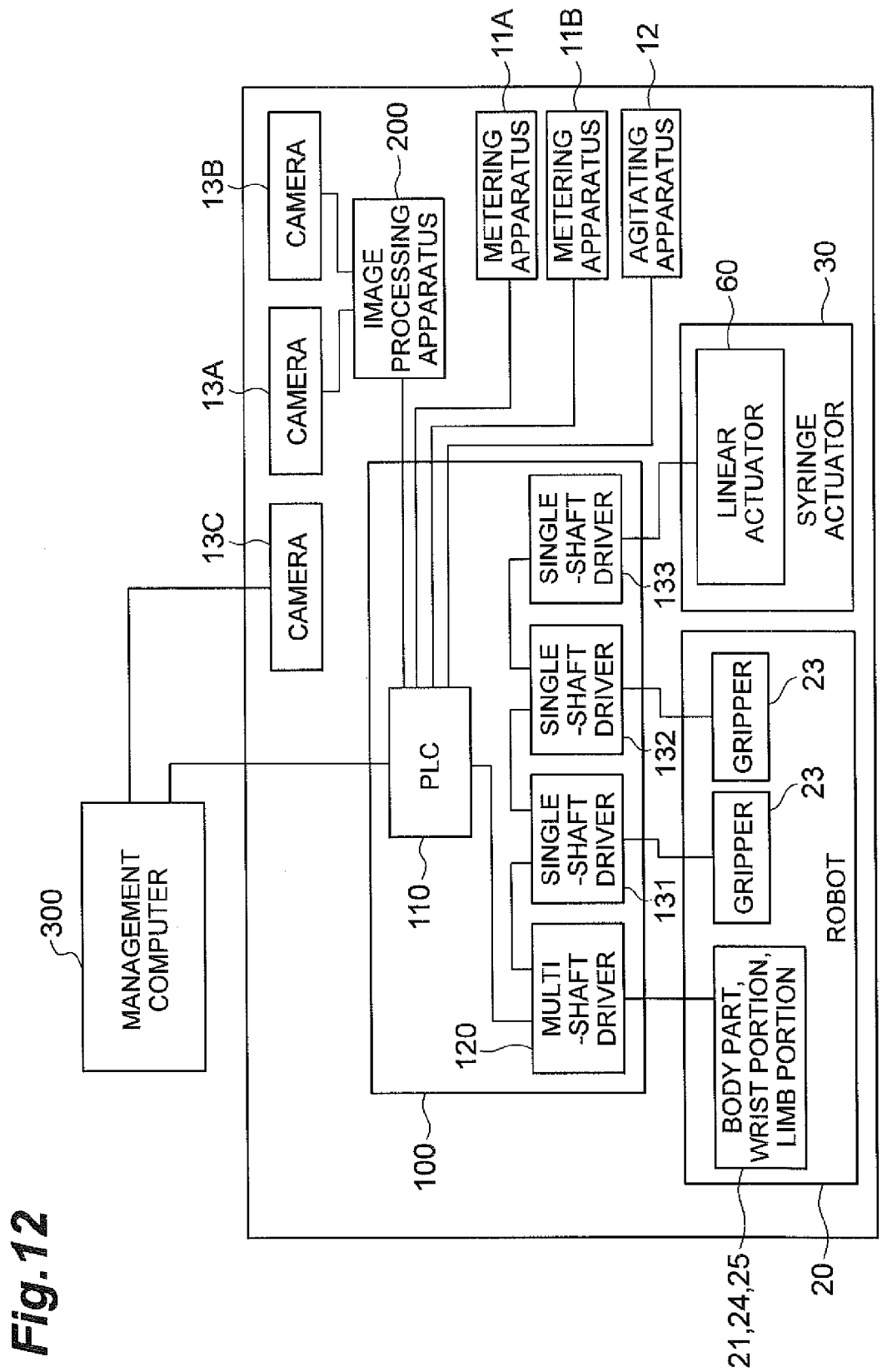
FIG. 12 is a block diagram illustrating a hardware configuration of the medicine manufacturing system.

Hereinafter, the controller 100 will be described in detail. As illustrated in FIG. 12, the controller 100 includes a PLC 110, a multi-shaft driver 120, and single-shaft drivers 131, 132, and 133. The multi-shaft driver 120 controls all the actuators for the transfer of the wrist portion 24 and the rotation of the gripper 23. Each of the single-shaft drivers 131 and 132 controls the actuator to open or close the finger portions 23a and 23b of the gripper 23. The single-shaft driver 133 controls the linear actuator 60 of the syringe driving apparatus 30.

The PLC 110 controls the multi-jointed robot 20 and the syringe driving apparatus 30 through the multi-shaft driver 120 and the single-shaft drivers 131, 132, and 133. In addition, the PLC 110 performs control (for example, turning on/off the switching) of the agitating apparatus 12 in synchronization with control of the multi-jointed robot 20. Furthermore, the PLC 110 acquires metering results of the metering apparatuses 11A and 11B or an image processing result of the image processing apparatus 200 in synchronization with control of the multi-jointed robot 20, and transmits the results to the management computer 300.

Figure 13:
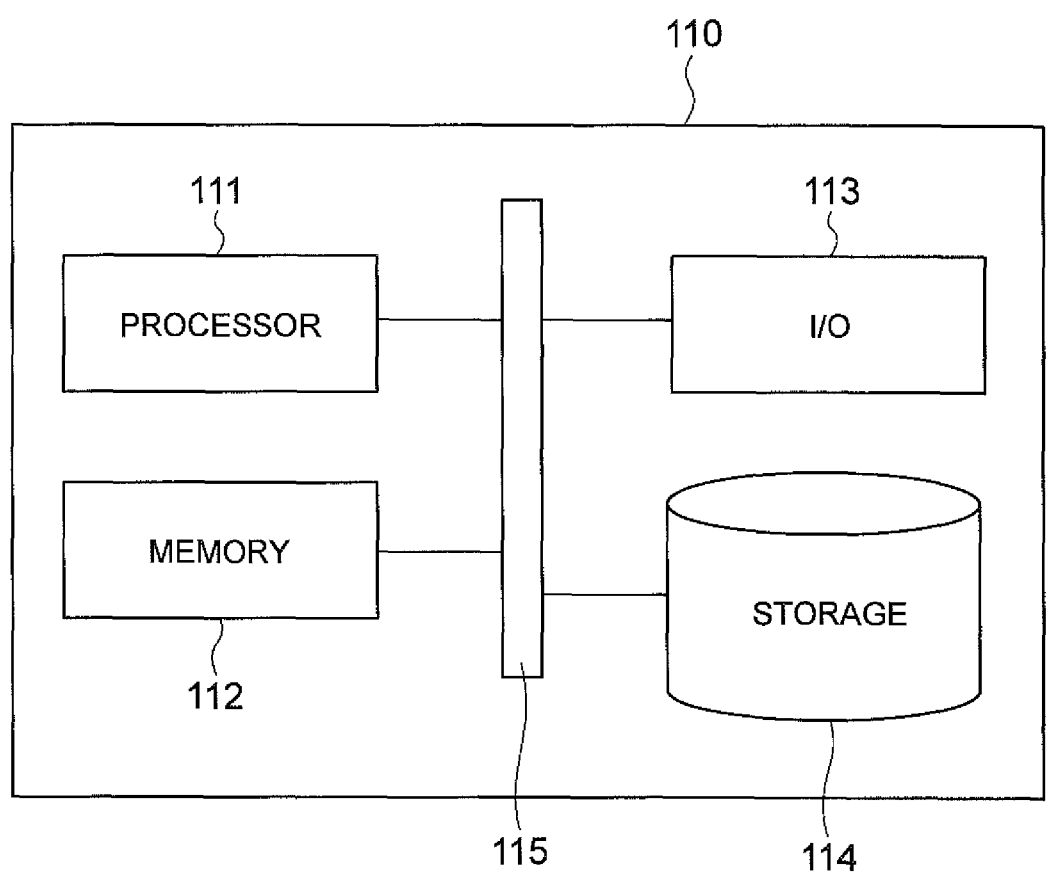
FIG. 13 is a block diagram illustrating a hardware configuration of PLC.
Figure 14:
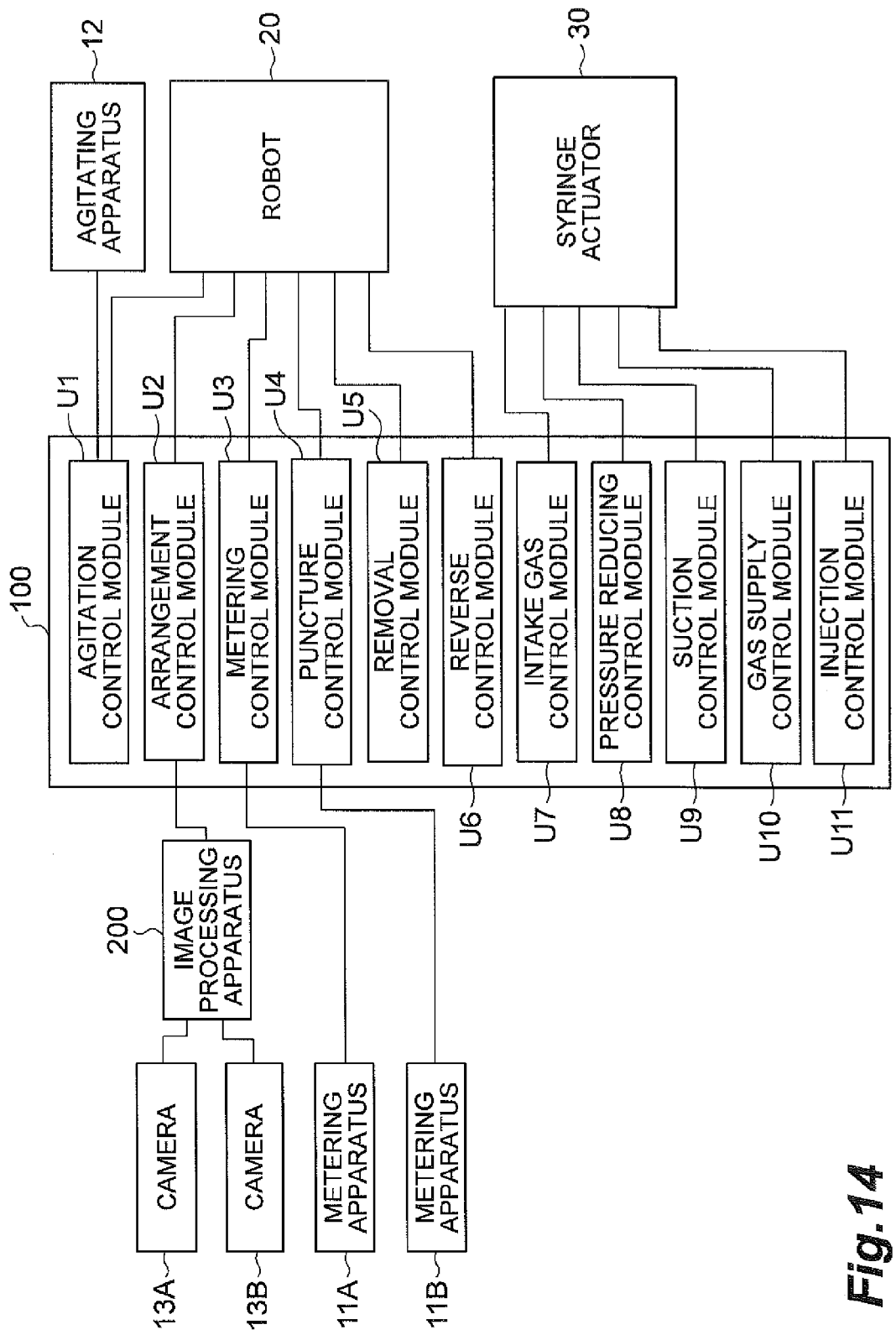
FIG. 14 is a block diagram illustrating a mechanical configuration of a controller.

As illustrated in FIG. 13, the PLC 110, for example, includes a processor 111, a memory 112, an input/output portion 113, a storage 114, and a bus 115 which connects these components to each other. The processor 111 executes a program in cooperation with at least any one of the memory 112 and the storage 114, and inputs/outputs data through the input/output portion 113 according to the execution result. Therefore, various functions of the controller 100 are realized. FIG. 14 illustrates these functions as virtual blocks (hereinafter, referred to as "functional blocks").

As illustrated in FIG. 14, the controller 100 includes an agitation control module U1, an arrangement control module U2, a metering control module U3, a puncture control module U4, a removal control module U5, a reverse control module U6, an intake gas control module U7, a pressure reducing control module U8, a suction control module U9, an gas supply control module U10, and an injection control module U1 as the functional blocks. These functional blocks are merely plural blocks obtained by partitioning the function of the controller 100 for convenience sake, but it does not mean that the hardware of the controller 100 is divided into such blocks. In addition, it is not limited that the respective functional blocks are realized by executing the program, but each block may be realized by a dedicated electrical circuit (for example, a logical circuit).

The agitation control module U1 controls the multi-jointed robot 20 such that the vial 16 is transferred onto the agitating apparatus 12, and controls the agitating apparatus 12 such that the vial 16 is oscillated.

The arrangement control module U2 transfers at least one of the liquid medicine bag 15, the vial 16, and the syringe 17, and controls the multi-jointed robot 20 such that the subject component is disposed at a target position.

The metering control module U3 controls the multi-jointed robot 20 such that at least one of the liquid medicine bag 15 and the vial 16 is transferred onto the metering apparatus 11A, and then acquires the metering result of the metering apparatus 11A. In addition, the metering control module U3 controls the multi-jointed robot 20 such that the syringe 17 is transferred onto the metering apparatus 11B, and then acquires the metering result of the metering apparatus 11B.

The puncture control module U4 controls the multi-jointed robot 20 such that the needle 17e of the syringe 17 punctures the liquid medicine bag 15 or the vial 16. In addition, the puncture control module U4 controls the multi-jointed robot 20 such that the inserting length of the needle 17e becomes a value close to a target value.

The removal control module U5 controls the multi-jointed robot 20 such that the needle 17e of the syringe 17 is removed from the liquid medicine bag 15 or the vial 16.

The reverse control module U6 controls the multi-jointed robot 20 such that the rotation unit 50 is reversed upside down by rotating the rotation unit 50.

The intake gas control module U7 controls the syringe driving apparatus 30 such that a gas is absorbed into the syringe 17 by pulling the plunger 17c.

The pressure reducing control module U8 controls the syringe driving apparatus 30 such that the inner pressure of the vial 16 is decreased by pulling the plunger 17c.

The suction control module U9 controls the syringe driving apparatus 30 such that the fluid in the vial 16 is absorbed into the syringe 17 by pulling the plunger 17c.

The gas supply control module U10 controls the syringe driving apparatus 30 such that the gas in the syringe 17 is injected into the vial 16 by pushing the plunger 17c.

The injection control module U11 controls the syringe driving apparatus 30 such that the fluid in the syringe 17 is injected into the liquid medicine bag 15 by pushing the plunger 17c.

With the configurations of the arrangement control module U2, the puncture control module U4, the reverse control module U6, and the suction control module U9, the controller 100 can perform, for example, control of the multi-jointed robot 20 such that the vertical relation between the vial 16 and the syringe 17 is reversed in a state where the vial 16 containing the fluid is disposed on the lower side of the syringe 17 and the needle 17e punctures the vial 16, and control of the syringe driving apparatus 30 such that the liquid in the vial 16 is absorbed into the syringe 17 by pulling the plunger 17c in a state where the vial 16 is disposed on the upper side of the syringe 17.

Specifically, after the cylinder body 17a is held in the cylinder body holder 33, the controller 100 can perform control of the multi-jointed robot 20 such that the vial 16 containing the fluid is disposed on the lower side of the syringe 17, control of the multi-jointed robot 20 such that the needle 17e punctures the vial 16 in a state where the vial 16 is disposed on the lower side of the syringe 17, control of the multi-jointed robot 20 such that the vertical relation between the vial 16 and the syringe 17 is reversed by rotating the rotation unit 50 in a state where the needle 17e punctures the vial 16, and control of the syringe driving apparatus 30 such that the fluid in the vial 16 is absorbed into the syringe 17 by pulling the plunger 17c in a state where the vial 16 is disposed on the upper side of the syringe 17.

With the configurations of the intake gas control module U7 and the gas supply control module U10, the controller 100 can perform control of the syringe driving apparatus 30 such that the gas in the syringe 17 is absorbed by pulling the plunger 17c before the multi-jointed robot 20 is controlled such that the needle 17e punctures the vial 16, and control of the syringe driving apparatus 30 such that the gas in the syringe 17 is injected into the vial 16 by pushing the plunger 17c after the syringe driving apparatus 30 is controlled such that the liquid in the vial 16 is absorbed into the syringe 17 by pulling the plunger 17c.

When the needle 17e punctures the vial 16, the controller 100 may perform control of the multi-jointed robot 20 such that the tip portion of the needle 17e does not reach the liquid in the vial 16.

With the configuration of the pressure reducing control module U8, the controller 100 can perform control of the syringe driving apparatus 30 such that the inner pressure of the vial 16 is decreased by pulling the plunger 17c after the multi-jointed robot 20 is controlled such that the needle 17e punctures the vial 16, and before the multi-jointed robot 20 is controlled such that the vertical relation between the vial 16 and the syringe 17 is reversed.

With the configurations of the removal control module U5 and the injection control module U11, the controller 100 can perform control of the multi-jointed robot 20 such that the needle 17e is removed from the vial 16, control of the multi-jointed robot 20 such that the needle 17e punctures the liquid medicine bag 15, and control of the syringe driving apparatus 30 such that the fluid in the syringe 17 is injected into the liquid medicine bag 15 by pushing the plunger 17c.

The controller 100 may control the multi-jointed robot 20 such that the syringe 17 is handled by one (for example, the multi-jointed arm 22B) of the multi-jointed arms 22A and 22B, and the vial 16 is handled by the other one (for example, the multi-jointed arm 22A) of the multi-jointed arms 22A and 22B.

(Medicine Manufacturing Method)

As described above, the controller 100 serves as a fluid transfer controller, and performs a fluid transfer control method. The medicine manufacturing system 1 manufactures a medicine by performing the fluid transfer control method by the controller 100 according to the control pattern set by the management computer 300. Hereinafter, a specific example of a medicine manufacturing method performed by the medicine manufacturing system 1 will be described. Further, since a transfer target fluid is a raw liquid medicine, a liquid transfer control method is performed in the medicine manufacturing method, the controller 100 serves as a liquid transfer controller. In other words, the fluid transfer system 1A is used as a liquid transfer system.

Figure 15:
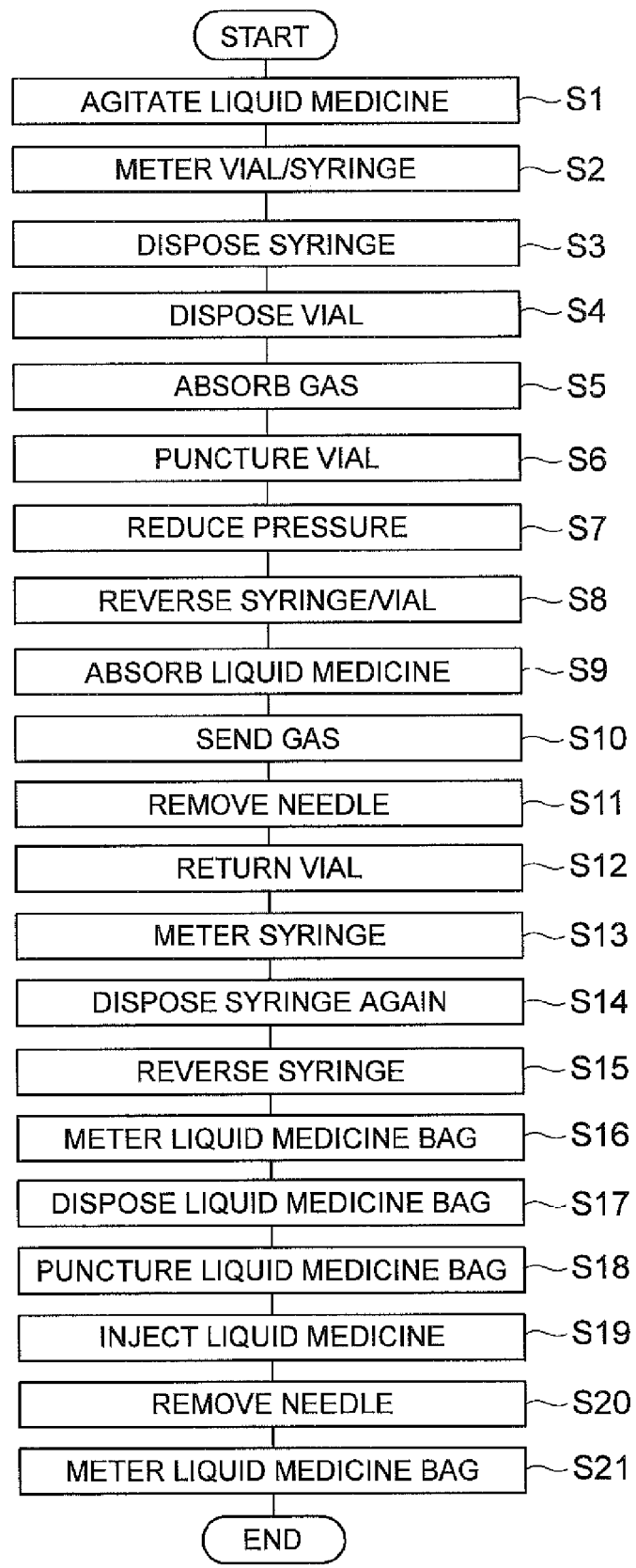
FIG. 15 is a flowchart of a medicine manufacturing method.

As illustrated in FIG. 15, first, the agitation control module U1 performs control of agitating the raw liquid medicine (Step S1). For example, the agitation control module U1 controls the multi-jointed robot 20 such that the vial 16 is transferred onto the agitating apparatus 12 from the tray 14, and controls the agitating apparatus 12 such that the vial 16 is oscillated.

Next, the metering control module U3 performs control of metering the vial 16 and the syringe 17 (Step S2). For example, the metering control module U3 controls the multi-jointed robot 20 such that the vial 16 on the tray 14 is transferred while being gripped by the gripper 23 of the multi-jointed arm 22A, and placed on the metering apparatus 11A. In addition, the metering control module U3 controls the multi-jointed robot 20 such that the cylinder body 17a of the syringe 17 on the tray 14 is transferred while being gripped by the gripper 23 of the multi-jointed arm 22B, and is placed on the metering apparatus 11B with the needle 17e set upward. Thereafter, the metering control module U3 acquires the metering results of the metering apparatuses 11A and 11B.

Next, the arrangement control module U2 performs control in which the syringe 17 is held in the cylinder body holder 33 (Step S2). For example, the arrangement control module U2 controls the multi-jointed robot 20 such that the cylinder body 17a of the syringe 17 on the metering apparatus 11B is transferred toward the syringe driving apparatus 30 while being gripped by the gripper 23 of the multi-jointed arm 22B, and held in the cylinder body holder 33 (see FIG. 7).

Figure 16:
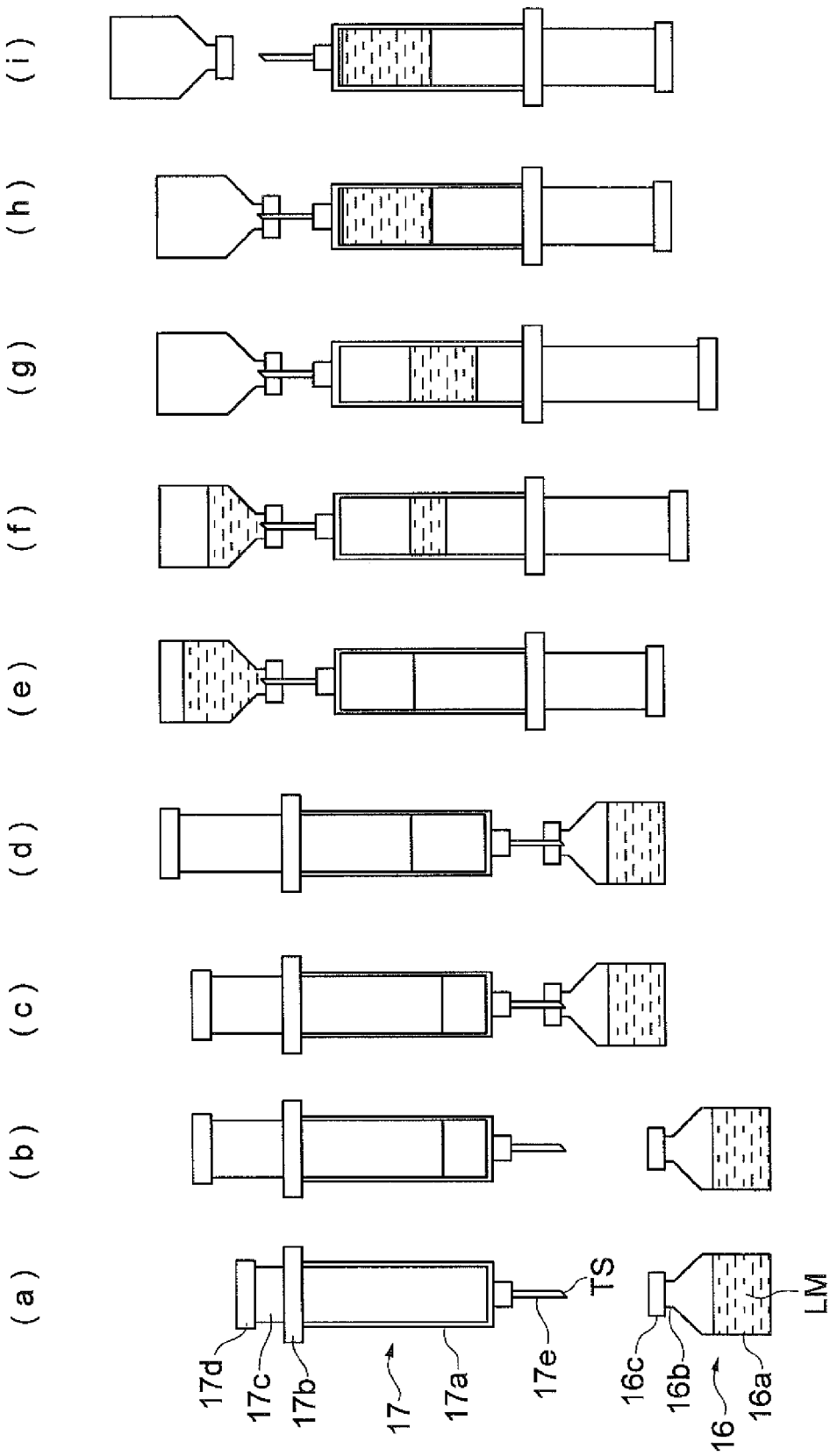
FIG. 16 illustrates a diagram for describing the transfer of fluid in states (a) to (i).

Next, the arrangement control module U2 performs control in which the vial 16 is disposed on the lower side of the syringe 17 (Step S3, see the state (a) of FIG. 16). For example, the arrangement control module U2 controls the multi-jointed robot 20 such that the vial 16 on the agitating apparatus 12 is transferred toward the syringe driving apparatus 30 while being gripped by the gripper 23 of the multi-jointed arm 22A, and held in the vial holding portion 34 (see FIG. 7).

In a case where the vial holding portion 34 is positioned on the lower side of the cylinder body holder 33 when the vial 16 is held in the vial holding portion 34, the vial 16 is disposed on the lower side of the syringe 17. In a case where the vial holding portion 34 is positioned on the upper side of the cylinder body holder 33 when the vial 16 is held in the vial holding portion 34, the vial 16 is disposed on the upper side of the syringe 17. In this case, it is necessary to perform control of reversing the vertical relation between the vial 16 and the syringe 17 by the reverse control module U6. This control may be performed before or after the vial 16 is held in the vial holding portion 34.

Further, when the vial 16 is disposed, the rotation unit 50 may be obliquely disposed with respect to the vertical direction. In other words, the vial 16 may be not disposed immediately below the syringe 17, and may be disposed obliquely on the lower side of the syringe 17.

Next, the intake gas control module U7 performs control in which the gas is absorbed into the syringe 17 (Step S5, see the state (b) of FIG. 16). The intake gas control module U7 controls the syringe driving apparatus 30 such that the gas is absorbed into the syringe 17 by pulling the plunger 17c. At this time, a volume of the gas to be absorbed into the syringe 17 may be substantially matched with a predetermined volume of the liquid to be absorbed from inside the vial 16. Therefore, in Step S10 described below, the excessive increase in the pressure in the vial 16 is suppressed. Further, the substantial matching herein means that the volume of the gas to be absorbed into the intake gas control module U7 is 90% to 100% of the predetermined volume of the liquid to be absorbed from inside the vial 16.

Next, the puncture control module U4 performs control in which the needle 17e punctures the vial 16 (Step S6, see the state (c) of FIG. 16). For example, the puncture control module U4 controls the multi-jointed robot 20 such that the needle 17e punctures the vial 16 by approaching the vial 16 toward the syringe 17 while the vial 16 is gripped by the gripper 23 of the multi-jointed arm 22A. In addition, the puncture control module U4 controls the multi-jointed robot 20 such that the tip portion of the needle 17e does not reach the liquid in the vial 16.

Next, the pressure reducing control module U8 performs control in which the pressure in the vial 16 is reduced (Step S7, see the state of (d) FIG. 16). The pressure reducing control module U8 controls the syringe driving apparatus 30 such that the inner pressure of the vial 16 is reduced by pulling the plunger 17c.

Next, the reverse control module U6 performs control in which the vertical relation between the vial 16 and the syringe 17 is reversed (that is, the vial 16 is positioned on the upper side of the syringe 17) (Step S8, see the state (e) of FIG. 16). The reverse control module U6, for example, controls the multi-jointed robot 20 such that the vertical relation between the vial 16 and the syringe 17 is reversed by rotating the rotation unit 50 by the multi-jointed arm 22B. Specifically, the reverse control module U6 rotates the rotation unit 50 by sequentially performing the following controls.

i) The multi-jointed robot 20 is controlled such that the finger portions 23a and 23b of the gripper 23 are engaged with the engaging grooves 52a and 53a.

ii) The multi-jointed robot 20 is controlled such that the rotation unit 50 is pushed toward the rotation mechanism 40 by the gripper 23. Therefore, the rotation unit 50 is moved along the rotation center Ax1 (approach the rotation mechanism 40), and the rotation mechanism 40 is set to the allowing state.

iii) The gripper 23 is rotated, and the rotation unit 50 is rotated according to the rotation.

iv) The multi-jointed robot 20 is controlled such that the rotation unit 50 is pulled back from the rotation mechanism 40 by the gripper 23. Therefore, the rotation unit 50 is moved along the rotation center Ax1 (separate from the rotation mechanism 40), and the rotation mechanism 40 is set to the regulating state.

Next, the suction control module U9 performs control in which a raw liquid medicine LM in the vial 16 is absorbed into the syringe 17 (Step S9, see the states (f) and (g) of FIG. 16). The suction control module U9 controls the syringe driving apparatus 30 such that the raw liquid medicine LM in the vial 16 is absorbed into the syringe 17 by pulling the plunger 17c.

Next, the gas supply control module U10 performs control in which the gas in the syringe 17 is injected into the vial 16 (Step S10, see the state (h) of FIG. 16). The gas supply control module U10 controls the syringe driving apparatus 30 such that the gas in the syringe 17 is injected into the vial 16 by pushing the plunger 17c. At this time, a volume of the gas to be injected into the vial 16 may be subsequently matched with a volume of the raw liquid medicine LM absorbed in the syringe 17 in Step S9. Therefore, the excessive increase in the pressure in the vial 16 is suppressed. Further, the substantial matching herein means that the volume of the gas to be injected into the vial 16 is 90% to 100% of the volume of the raw liquid medicine LM absorbed in the syringe 17.

Next, the removal control module U5 performs control in which the needle 17e is removed from the vial 16 (Step S11, see the state (i) of FIG. 16). The removal control module U5 controls the multi-jointed robot 20 such that the needle 17e is removed from the vial 16 by setting the vial 16 apart from the syringe 17 while the vial 16 is gripped by the gripper 23 of the multi-jointed arm 22A.

Next, the arrangement control module U2 performs control in which the vial 16 is returned to the tray 14 (Step S12). For example, the arrangement control module U2 controls the multi-jointed robot 20 such that the vial 16 is taken out of the vial holding portion 34 while being gripped by the gripper 23 of the multi-jointed arm 22A, and transferred onto the tray 14.

Next, the metering control module U3 performs control in which the syringe 17 is metered (Step S13). For example, the metering control module U3 controls the multi-jointed robot 20 such that the syringe 17 is taken out of the cylinder body holder 33 and transferred while the cylinder body 17a held in the cylinder body holder 33 is gripped by the gripper 23 of the multi-jointed arm 22B, and is placed on the metering apparatus 11B with the needle 17e set upward. Thereafter, the metering control module U3 acquires the metering result of the metering apparatus 11B.

Next, the arrangement control module U2 performs control in which the syringe 17 is held in the cylinder body holder 33 again (Step S14). For example, the arrangement control module U2 controls the multi-jointed robot 20 such that the cylinder body 17a of the syringe 17 on the metering apparatus 11B is transferred toward the syringe driving apparatus 30 while being gripped by the gripper 23 of the multi-jointed arm 22B, and held in the cylinder body holder 33.

Next, the reverse control module U6 performs control in which the syringe 17 is vertically reversed (Step S15). For example, the reverse control module U6 controls the multi-jointed robot 20 such that the needle 17e faces downward by rotating the rotation unit 50 by the multi-jointed arm 22B. The sequence of rotating the rotation unit 50 is the same as that of Step S8.

Next, the metering control module U3 performs control in which the liquid medicine bag 15 is metered (Step S16). For example, the metering control module U3 controls the multi-jointed robot 20 such that the liquid medicine bag 15 on the tray 14 is transferred while being gripped by the gripper 23 of the multi-jointed arm 22A, and placed on the metering apparatus 11A. Thereafter, the metering control module U3 acquires the metering result of the metering apparatus 11A.

Next, the arrangement control module U2 performs control in which the liquid medicine bag 15 is disposed on the lower side of the syringe 17 (Step S17). For example, the arrangement control module U2 controls the multi-jointed robot 20 such that the liquid medicine bag 15 on the metering apparatus 11A is transferred while being gripped by the gripper 23 of the multi-jointed arm 22A, and disposed on the lower side of the syringe 17.

Next, the puncture control module U4 performs control in which the needle 17e punctures the liquid medicine bag 15 (Step S18). For example, the puncture control module U4 controls the multi-jointed robot 20 such that the needle 17e punctures the liquid medicine bag 15 by approaching the liquid medicine bag 15 toward the syringe 17 while the liquid medicine bag 15 is gripped by the gripper 23 of the multi-jointed arm 22A.

Next, the injection control module U11 performs control in which the raw liquid medicine in the syringe 17 is injected into the liquid medicine bag 15 (Step S19). The injection control module U11 controls the syringe driving apparatus 30 such that the raw liquid medicine in the syringe 17 is injected into the liquid medicine bag 15 by pushing the plunger 17c.

Next, the removal control module U5 performs control in which the needle 17e is removed from the liquid medicine bag 15 (Step S20). For example, the removal control module U5 controls the multi-jointed robot 20 such that the needle 17e is removed from the liquid medicine bag 15 by setting the liquid medicine bag 15 apart from the syringe 17 while the liquid medicine bag 15 is gripped by the gripper 23 of the multi-jointed arm 22A.

Next, the metering control module U3 performs control in which the liquid medicine bag 15 is metered (Step S21). For example, the metering control module U3 controls the multi-jointed robot 20 such that the liquid medicine bag 15 is transferred while being gripped by the gripper 23 of the multi-jointed arm 22A, and placed on the metering apparatus 11A. Thereafter, the metering control module U3 acquires the metering result of the metering apparatus 11A.

In a case where a plurality of types of the raw liquid medicines each contained in a plurality of vials 16 are used, the above processes are repeatedly performed for each vial 16. From those described above, the manufacturing of the medicine is completed. Further, the sequence of Steps S1 to S21 can be appropriately changed. In addition, a plurality of steps may be performed at the same time.

Various types of control parameters may be changed according to the types of the raw liquid medicines. As the control parameter, the amount of the gas to be absorbed in Step S5, the inserting length of the needle 17e in Step S6, the pulling amount of the plunger 17c in Step S7, the pulling amount/speed of the plunger 17c in Step S9, and a volume of the gas to be injected into the vial 16 in Step S10 are exemplified. As a specific method of changing various types of the control parameters according to the types of the raw liquid medicines, a database is previously created by associating the types of the raw liquid medicines and the control parameters, and the database is referred by the respective controllers. As a storage place of the database, the storage 114 of the PLC 110 or the storage of the management computer 300 is exemplified.

According to the medicine manufacturing method described above, through control of the multi-jointed robot 20 and the syringe driving apparatus 30, the transfer work of the raw liquid medicine from the vial 16 to the syringe 17 can be automated, and the transfer work of the raw liquid medicine from the syringe 17 to the liquid medicine bag 15 can also be automated. Therefore, the liquid transfer work can be automated while suppressing an increase in size of the facility.

The liquid transfer control method from the vial 16 to the syringe 17 includes control of the multi-jointed robot 20 such that the vial 16 containing the liquid is disposed on the lower side of the syringe 17, control of the multi-jointed robot 20 such that the needle 17e of the syringe 17 punctures the vial 16 in a state where the vial 16 is disposed on the lower side of the syringe 17, control of the multi-jointed robot 20 such that the vertical relation between the vial 16 and the syringe 17 is reversed in a state where the needle 17e punctures the vial 16, and control of the syringe driving apparatus 30 such that the raw liquid medicine in the vial 16 is absorbed into the syringe 17 by pulling the plunger 17c in a state where the vial 16 is disposed on the upper side of the syringe 17.

According to the method, the needle 17e punctures the upper portion of the vial 16 in a state where the raw liquid medicine is collected in the lower portion of the vial 16 and an air layer is formed in the upper portion of the vial 16. Therefore, in the middle of at least the puncturing, the air layer in the vial 16 communicates with the inside of the syringe 17. Before the puncturing, in a case where the inner pressure of the vial 16 is higher than the inner pressure of the syringe 17, the inner pressure of the vial 16 is reduced by the communication between the air layer in the vial 16 and the inside of the syringe 17. Thereafter, in a state where the vertical relation between the vial 16 and the syringe 17 is reversed to gather the raw liquid medicine toward the needle 17e, the raw liquid medicine in the vial 16 is absorbed into the syringe 17. As described above, since the inner pressure of the vial 16 is reduced at the time of the puncturing, a leakage of the raw liquid medicine from the punctured portion of the needle 17e is suppressed when the raw liquid medicine is absorbed into the syringe 17. Since the raw liquid medicine is absorbed in a state where the liquid is gathered toward the needle 17e, a more raw liquid medicine can be efficiently absorbed into the vial 16. Therefore, the transfer work of the raw liquid medicine can be automated to transfer the raw liquid medicine with efficiency from inside the vial 16 into the syringe 17 while suppressing the leakage of the raw liquid medicine.

The liquid transfer control method further includes control of the syringe driving apparatus 30 such that the gas is absorbed into the syringe 17 by pulling the plunger 17c before the multi-jointed robot 20 is controlled to make the needle 17e puncture the vial 16, and control of the syringe driving apparatus 30 such that the gas in the syringe 17 is injected into the vial 16 by pushing the plunger 17c after the syringe driving apparatus 30 is controlled to absorb the raw liquid medicine in the vial 16 into the syringe 17 by pulling the plunger 17c.

Therefore, a negative pressure generated in the vial 16 when the raw liquid medicine is absorbed is reduced by injecting the gas in the syringe 17 into the vial 16. The leakage of the raw liquid medicine when the needle 17e is removed from the vial 16 is suppressed by reducing the negative pressure in the vial 16. Therefore, the leakage of the raw liquid medicine can be more suppressed in the automated transfer work of the raw liquid medicine. However, it is not essential that the gas in the syringe 17 is injected into the vial 16 after the raw liquid medicine in the vial 16 is absorbed into the syringe 17.

The liquid transfer control method controls the multi-jointed robot 20 such that the tip portion of the needle 17e does not reach the raw liquid medicine in the vial 16 when the needle 17e punctures the vial 16. Therefore, since the tip portion of the needle 17e remains in the air layer at the time of the puncturing, the inner pressure of the vial 16 is securely reduced. Therefore, the leakage of the raw liquid medicine can be more reduced in the automated transfer work of the raw liquid medicine. Further, there is a need to position the syringe 17 and the vial 16 with high accuracy in order to securely make the tip portion of the needle 17e remain in the air layer of the vial 16. Therefore, the characteristic of the multi-jointed robot 20 excellent in stability of the positioning can be more effectively utilized compared to manual work. However, it is not essential that the tip portion of the needle 17e does not reach the raw liquid medicine in the vial 16 when the needle 17e punctures the vial 16.

The liquid transfer control method further includes control of the syringe driving apparatus 30 such that the inner pressure of the vial 16 is reduced by pulling the plunger 17c after the multi-jointed robot 20 is controlled to make the needle 17e puncture the vial 16, and before the multi-jointed robot 20 is controlled to make the vertical relation between the vial 16 and the syringe 17 reversed.

Therefore, in a state where the tip portion of the needle 17e remains in the air layer, the inside of the vial 16 can be more reduced in pressure. Therefore, the leakage of the raw liquid medicine can be more suppressed in the automated transfer work of the raw liquid medicine. However, it is not essential that the inner pressure of the vial 16 is reduced by pulling the plunger 17c before the vertical relation between the vial 16 and the syringe 17 is reversed.

Second Embodiment

Subsequently, the liquid transfer work using a liquid transfer system 1B according to a second embodiment will be described while mainly referring to FIGS. 17 and 18. The liquid transfer system 1B has the same configuration as the fluid transfer system 1A according to the first embodiment (see FIG. 1), but is different in the content of the transfer work of the raw liquid medicine from the vial 16 to the syringe 17. In the following, the description will be made focusing on the difference.

Figure 17:
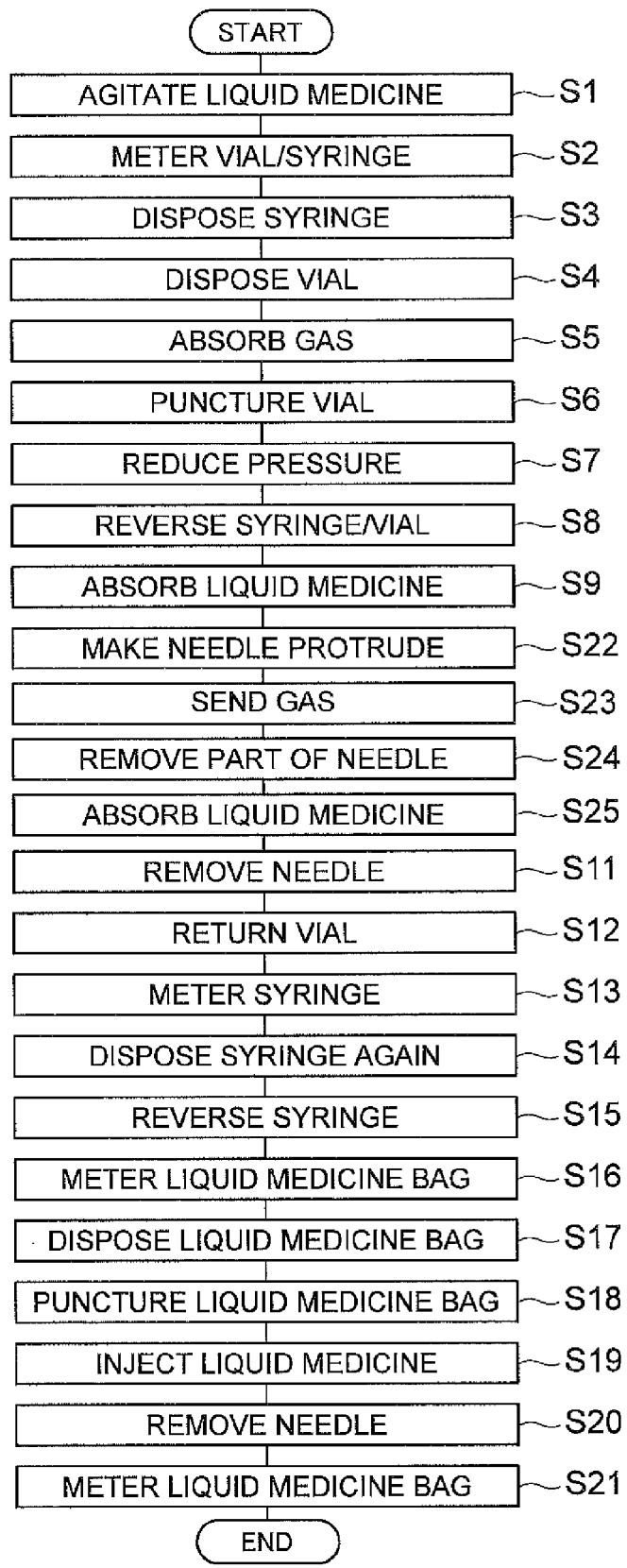
FIG. 17 is a flowchart of the medicine manufacturing method.

First, when the liquid transfer work using the liquid transfer system 1B according to the second embodiment starts, Steps S1 to 59 are performed similarly to the first embodiment as illustrated in FIG. 17. In Step S9, when the suction control module U9 performs control in which the raw liquid medicine LM in the vial 16 is absorbed into the syringe 17, the suction control module U9 controls the syringe driving apparatus 30 such that a part (for example, about ½₀ to ⅓) of the raw liquid medicine LM in the vial 16 is absorbed into the syringe 17 by pulling the plunger 17c (see the state (a) of FIG. 18).

Figure 18:
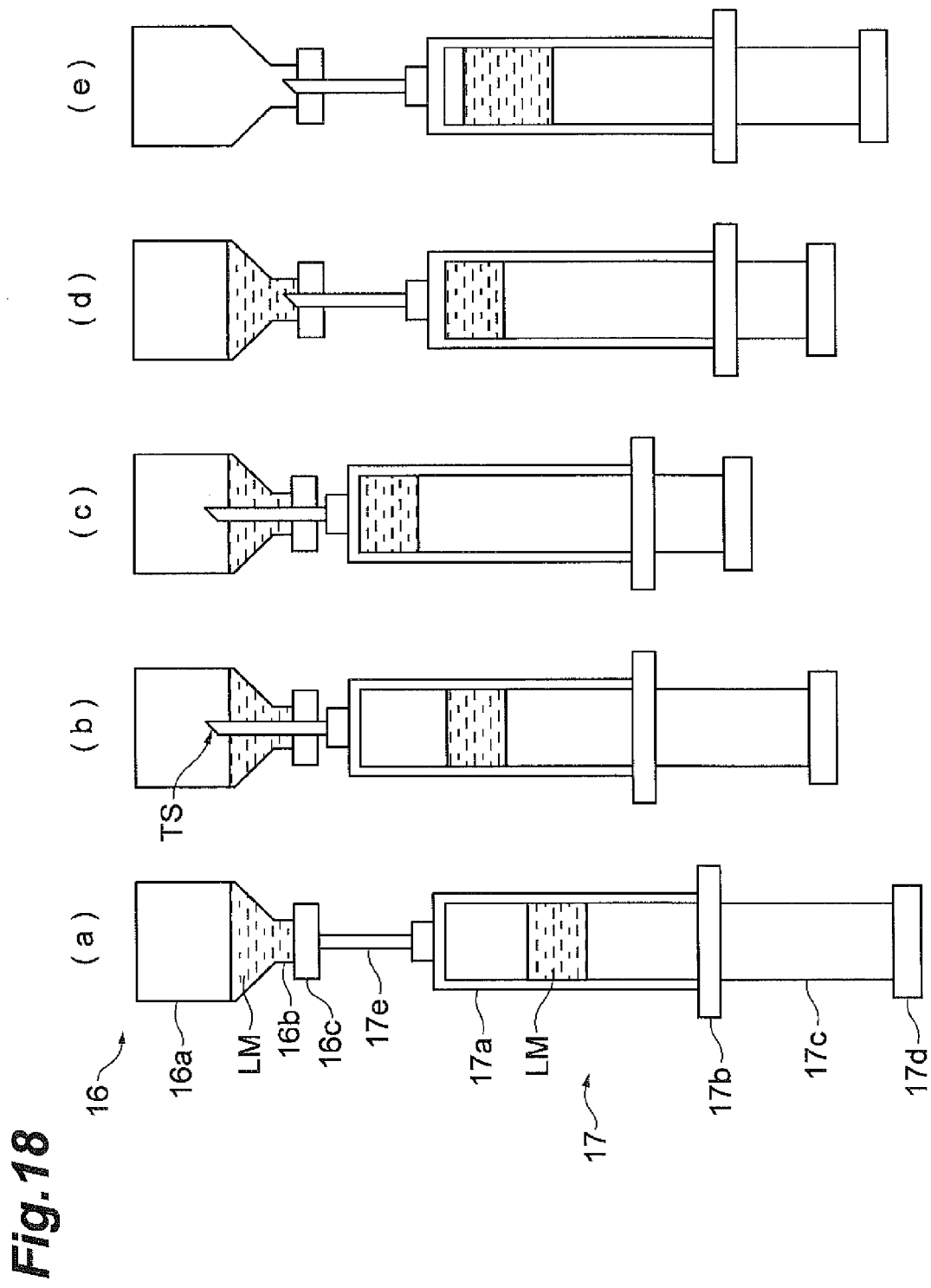
FIG. 18 is a diagram for describing the transfer of fluid in states (a) to (e).

Next, the puncture control module U4 performs control in which the tip portion of the needle 17e is positioned on the upper side from a liquid level of the raw liquid medicine in the vial 16 (Step S22, see the state (b) of FIG. 18). The puncture control module U4 controls the multi-jointed robot 20 such that the vial 16 gripped by the gripper 23 of the multi-jointed arm 22A more approaches the syringe 17, and the tip portion of the needle 17e protrudes toward the upper side from the liquid level.

Next, the gas supply control module U10 performs control in which the gas in the syringe 17 is injected into the vial 16 (Step S23, see the state (c) of FIG. 18). The gas supply control module U10 controls the syringe driving apparatus 30 such that the gas in the syringe 17 is injected into the vial 16 by pushing the plunger 17c. At this time, the volume of the gas to be injected into the vial 16 may be subsequently matched with the volume of the raw liquid medicine LM absorbed into the syringe 17 in Step S9. Therefore, the excessive increase in the pressure in the vial 16 is suppressed. Further, the substantial matching herein means that the volume of the gas to be injected into the vial 16 is 90% to 100% of the volume of the raw liquid medicine LM absorbed in the syringe 17.

Next, the removal control module U5 performs control in which a part of the needle 17e is removed from the vial 16 (Step S24, see the state (d) of FIG. 18). The removal control module U5 controls the multi-jointed robot 20 such that the needle 17e is partly removed from the vial 16 by setting the vial 16 apart from the syringe 17 while the vial 16 is gripped by the gripper 23 of the multi-jointed arm 22A. Specifically, the removal control module U5 controls the multi-jointed robot 20 such that the tip portion of the needle 17e is positioned in the vial 16 and in the vicinity of the cap 16c.

Next, the suction control module U9 performs control in which the raw liquid medicine LM remaining in the vial 16 is absorbed into the syringe 17 (Step S25, see the state (e) of FIG. 18). The suction control module U9 controls the syringe driving apparatus 30 such that the raw liquid medicine LM remaining in the vial 16 is absorbed into the syringe 17 by pulling the plunger 17c. Therefore, all the raw liquid medicine LM in the vial 16 is transferred into the syringe 17 through the needle 17e. In the following, Steps S11 to S21 are performed similarly to the first embodiment.

According to the medicine manufacturing method described above, the liquid transfer work can be automated while suppressing an increase in size of the facility similarly to the first embodiment.

The liquid transfer control method according to the second embodiment as described above includes: (A1) controlling the multi-jointed robot 20 such that the needle 17e of the syringe 17 punctures the cap 16c of the vial 16 storing the raw liquid medicine LM; after the control described in A1, (B1) controlling the syringe driving apparatus 30 such that the air in the syringe 17 is sent into the vial 16 by pushing the plunger 17c in a state where the vial 16 is positioned on the upper side of the syringe 17 and the tip portion of the needle 17e is positioned on the upper side from the raw liquid medicine LM in the vial 16; and after the control described in B1, (C1) controlling the syringe driving apparatus 30 such that the raw liquid medicine LM in the vial 16 is absorbed through the needle 17e by pulling the plunger 17c in a state where the tip portion of the needle 17e is positioned in the liquid in the vial 16.

By the way, when the entire amount of the raw liquid medicine LM in the vial 16 is transferred to the syringe 17 at a time, the air in the syringe 17 may be unintentionally transferred into the vial 16 by a difference in pressure between the vial 16 and the syringe 17. When the air passes through the raw liquid medicine LM in the vial 16, the raw liquid medicine LM foams, so that it may be difficult to read the scale of an accurate amount of the raw liquid medicine LM. However, according to the method of the second embodiment, the entire amount of the raw liquid medicine LM in the vial 16 is not transferred to the syringe 17 at a time, but after a part of the raw liquid medicine LM in the vial 16 is transferred to the syringe 17, the air in the syringe 17 is sent into the air layer in the vial 16. Therefore, before an unintended movement of the air is generated from the syringe 17 to the vial 16, the air in the syringe 17 is returned into the vial 16, and at this time, the air in the syringe 17 does not pass through the raw liquid medicine LM in the vial 16. Therefore, the foaming of the raw liquid medicine LM is extremely suppressed. As a result, an accurate amount of the raw liquid medicine LM can be leaked from the vial 16 by the syringe 17.

Third Embodiment

Subsequently, the liquid transfer work using a liquid transfer system 1C according to a third embodiment will be mainly described while mainly referring to FIGS. 19 and 20. The liquid transfer system 1C is different in that the vial holding portion 34 is not provided and the vial 16 is held by the finger portions 23a and 23b of the gripper 23 in the fluid transfer system 1A according to the first embodiment (see FIG. 19), and the functional block of the controller 100 is also different (see FIG. 20). In the following, the description will be made focusing on the differences.

Figure 19:
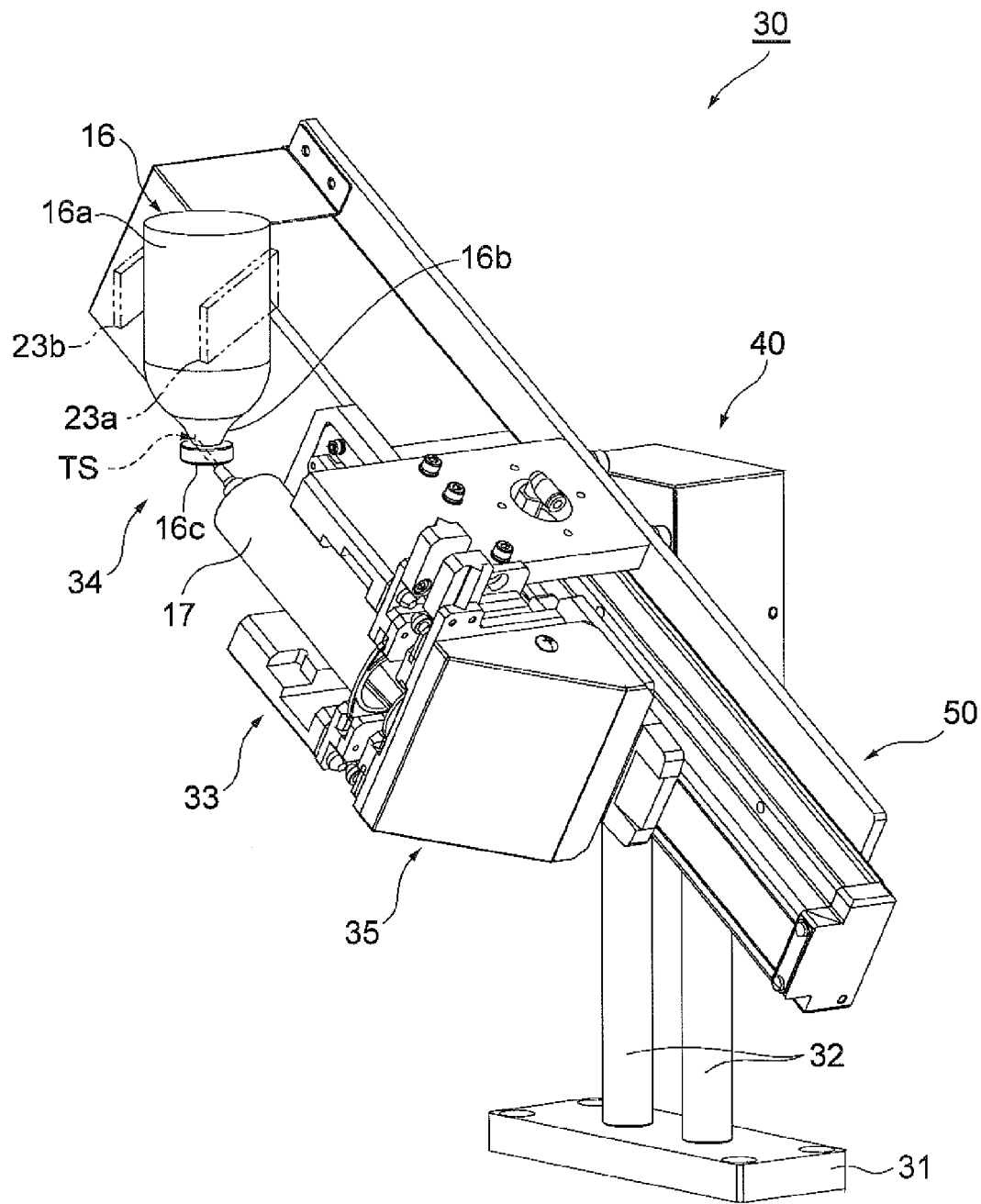
FIG. 19 is a diagram illustrating states of the vial and the syringe after an orientation is changed.

As illustrated in FIG. 19, since the vial 16 is held by the finger portions 23a and 23b of the gripper 23, the orientation of the vial 16 can be freely changed by the gripper 23. Therefore, the orientation of the vial 16 with respect to the syringe 17 is determined by at least one of the driving of the gripper 23 and the rotation of the rotation unit 50 in the syringe driving apparatus 30. The gripper 23 included in the multi-jointed arm 22A on one side may change the orientation of the vial while gripping the vial 16, and the gripper 23 included in the multi-jointed arm 22B on the other side may change the orientation of the syringe 17 while gripping the syringe 17.

Figure 20:
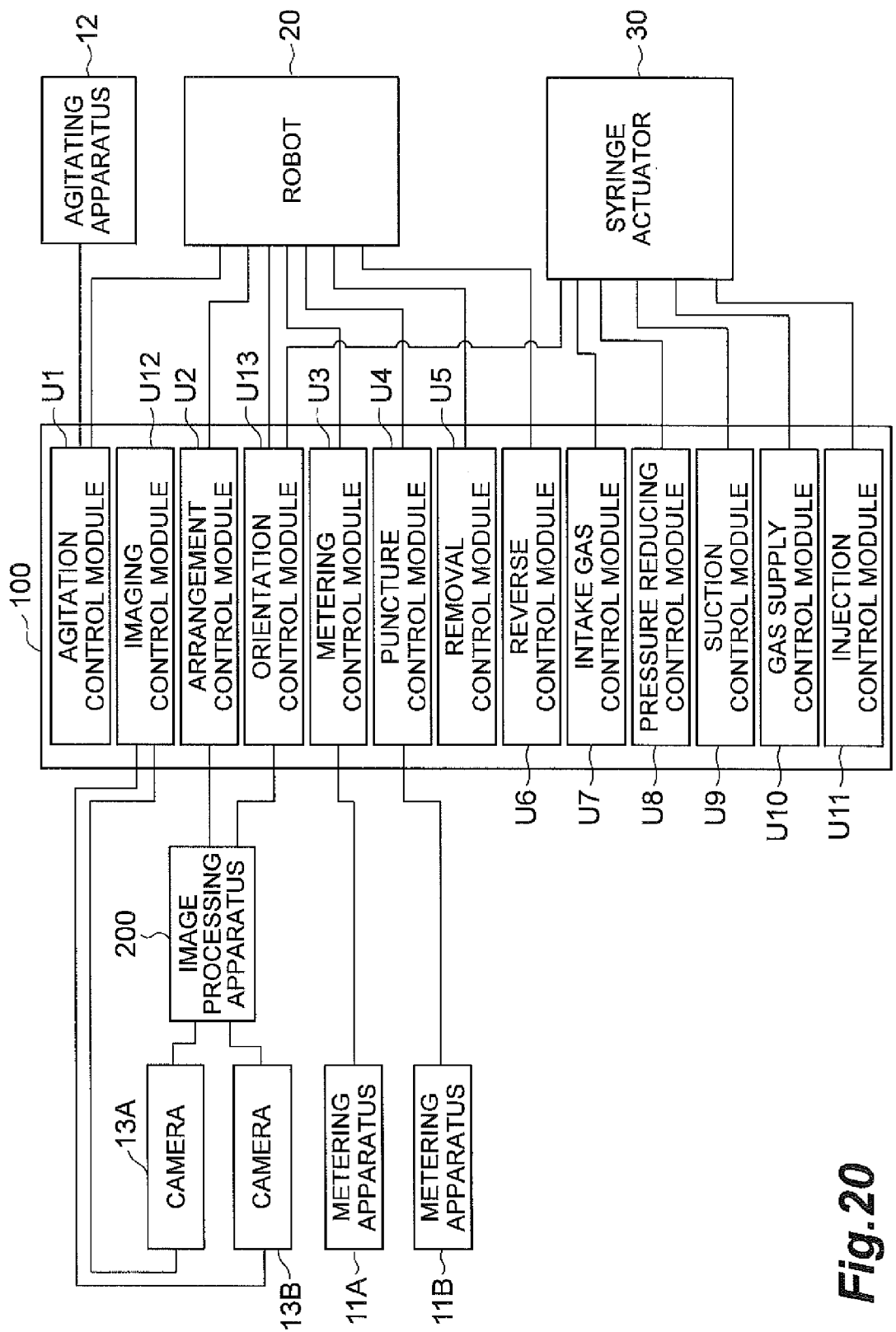
FIG. 20 is a block diagram illustrating a mechanical configuration of the controller.

As illustrated in FIG. 20, the controller 100 includes an imaging control module U12 and an orientation control module U13 as the functional block. The imaging control module U12 controls the cameras 13A and 13B such that the cameras 13A and 13B take images at a predetermined timing (for example, the tip portion of the needle 17e is taken). The orientation control module U13 controls at least one of the multi-jointed robot 20 and the syringe driving apparatus 30 such that the vial 16 takes an orientation with respect to the syringe 17. Specifically, the controller 100 can perform control of at least one of the multi-jointed robot 20 and the syringe driving apparatus 30 such that the needle 17e is inclined with respect to the cap 16c of the vial 16 by changing the orientation of at least one of the vial 16 and the syringe 17 by the orientation control module U13.

Subsequently, the liquid transfer work using the liquid transfer system 1C according to the third embodiment will be described. When the transfer work starts, Steps S1 to S21 illustrated in FIG. 15 are performed similarly to the first embodiment. In particular, in the third embodiment, after the needle 17e punctures the cap 16c of the vial 16 in Step S6 and when any one of Steps S6 to S9 is performed, the orientation of the vial 16 with respect to the syringe 17 is adjusted such that the needle 17e is inclined with respect to the cap 16c of the vial 16 (see FIG. 19).

According to the medicine manufacturing method described above, similarly to the first embodiment, the liquid transfer work can be automated while suppressing an increase in size of the facility.

The liquid transfer control method according to the third embodiment as described above includes: (A2) controlling the multi-jointed robot 20 such that the needle 17e of the syringe punctures the cap 16c of the vial 16 storing the raw liquid medicine LM; after the control described in A2, (B2) controlling the syringe driving apparatus 30 such that the raw liquid medicine LM in the vial 16 is absorbed through the needle 17e by pulling the plunger 17c; and after the control described in A2, (C2) controlling the multi-jointed robot 20 such that the needle 17e is inclined with respect to the cap 16c of the vial 16 by changing the orientation of at least one of the vial 16 and the syringe 17.

According to the method of the third embodiment as described above, since the needle 17e is inclined with respect to the cap 16c of the vial 16, the tip portion of the needle 17e approaches the cap 16c and is positioned in the vicinity of the inner wall of the vial 16. Therefore, a more amount of the raw liquid medicine LM collected in the vicinity of the cap 16c of the vial 16 can be absorbed by the syringe 17 compared to the case where the raw liquid medicine LM in the vial 16 is absorbed by the syringe 17 in a state where the needle 17e is disposed vertically with respect to the cap 16c. Therefore, it is possible to use the raw liquid medicine LM in the vial 16 without waste.

Hitherto, the description has been made about the embodiments, but the invention is not limited to the above-mentioned embodiments, and various changes can be made in a scope without departing from the spirit of the invention. For example, the application of the fluid transfer system 1A is not limited to the medicine manufacturing system 1, and various systems which necessitate a manual liquid transfer in a biological field, a medical field or the like. As a specific example, a culture system which necessitates a culture solution transfer is exemplified.

In the second embodiment, according to information on the type of the raw liquid medicine LM stored in the vial 16, (i) Steps S6 to S9 and S22 to S25 illustrated in FIG. 17 may be sequentially performed, (ii) Steps S6 to S9 illustrated in FIG. 17 may be sequentially performed except Steps S22 to S25. In the case of the latter (ii), in Step S9, the suction control module U9 controls the syringe driving apparatus 30 such that all of the raw liquid medicine LM in the vial 16 is absorbed into the syringe 17 by pulling the plunger 17c.

The information on the type of the raw liquid medicine LM may be stored in a storage as a database in association with information on the characteristic of the raw liquid medicine LM. As the storage for storing the database, as described above, the storage 114 of the PLC 110 (see FIG. 13) or the storage of the management computer 300 (see FIG. 1) is exemplified.

As the information on the characteristic of the raw liquid medicine LM, a viscosity is exemplified. When the viscosity of the raw liquid medicine LM is high, even in a case where an absorption speed (a pulling speed of the plunger 17c) of the raw liquid medicine LM in the vial 16 by the syringe 17 is small, foam is easily generated in the raw liquid medicine LM and the generated foam is hardly removed. In addition, in a case where the viscosity of the raw liquid medicine LM is high, Steps S6 to S9 and S22 to S25 illustrated in FIG. 17 may be sequentially performed. On the other hand, when the viscosity of the raw liquid medicine LM is low, even in a case where the absorption speed (the pulling speed of the plunger 17c) of the raw liquid medicine LM in the vial 16 by the syringe 17 is large, foam is hardly generated in the raw liquid medicine LM and the generated foam is easily removed even when foam is generated. Then, in a case where the viscosity of the raw liquid medicine LM is low, Steps S6 to S9 illustrated in FIG. 17 may be sequentially performed except Step S22 to S25. In this way, the control parameter may be associated according to the characteristic (the viscosity) of the raw liquid medicine LM. In the database, the information on the type of the raw liquid medicine LM and the control parameter may be directly associated.

As another control parameter to be changed according to the type of the raw liquid medicine LM, the orientation of the vial 16 or the syringe 17 in Steps S9 and S25 is exemplified in addition to the absorption speed. When the orientation of the vial 16 is changed to make the cap 16c inclined with respect to the horizontal plane, the raw liquid medicine LM in the vial 16 is collected on the inclined side of the cap 16c, so that a more amount of the collected raw liquid medicine LM can be absorbed by the syringe 17. When the tip portion of the needle 17e is inclined upward and the orientation of the syringe 17 is changed to make the syringe 17 inclined with respect to the horizontal plane, the raw liquid medicine LM absorbed into the syringe 17 is transferred along the inner surface of the cylinder body 17a, so that foam is hardly generated in the absorbed raw liquid medicine LM.

As another control parameter to be changed according to the type of the raw liquid medicine LM, a rest time after a predetermined amount of the raw liquid medicine LM in the vial 16 is absorbed by the syringe 17 is exemplified.

In the third embodiment, the tilted surface TS in the tip portion of the needle 17e may enter a state of approaching an inner wall surface in the vial 16 while facing the inner wall surface in the vial 16 (see FIG. 19). The tilted surface TS of the needle 17e may face any area in the inner wall surface in the vial 16 as long as the cap 16c is horizontally kept. The tilted surface TS of the needle 17e may face an area on the lower side of the inner wall surface of the inclined vial 16 as long as the cap 16c is inclined with respect to the horizontal plane. In this case, since the tilted surface TS of the needle 17e faces a place where the raw liquid medicine LM is easily collected in the vial 16, a more amount of the raw liquid medicine LM collected in the vicinity of the cap 16c of the vial 16 can be securely absorbed by the syringe 17.

In consideration of that the rotation unit 50 rotates about the rotation center Ax2 as the center axis, in the third embodiment, the syringe 17 may be attached to the rotation unit 50 such that a direction of alignment of the tip portion of the needle 17e in the tilted surface TS and the base end of the needle 17e in the tilted surface TS becomes subsequently equal to the radius direction with the rotation center Ax2 as the center. In this case, the tilted surface TS of the needle 17e easily faces the area positioned on the lower side in the inner wall surface in the inclined vial 16. Alternatively, the syringe driving apparatus 30 may be configured such that the rotation unit 50 can be rotated about the rotation shaft perpendicular to the rotation center Ax1.

In the third embodiment, when the orientation of the vial 16 with respect to the syringe 17 is adjusted, the image processing apparatus 200 may process the images taken by the cameras 13A and 13B and the orientation control module U13 may control at least one of the multi-jointed robot 20 and the syringe driving apparatus 30 based on the processing result. In this case, the liquid transfer system 1C can automatically determine the orientation of the vial 16 or the syringe 17.

In the third embodiment, the orientation of the vial 16 with respect to the syringe 17 may be changed while the raw liquid medicine LM in the vial 16 is absorbed by the syringe 17. Specifically, at least one of the vial 16 and the syringe 17 may be changed in its slope while pulling the plunger 17c. In this case, the raw liquid medicine LM can be efficiently absorbed according to an absorbed amount of the raw liquid medicine LM by the syringe 17 (that is, according to a remaining amount of the raw liquid medicine LM in the vial 16).

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forums or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A fluid transfer system comprising:
a multi jointed robot configured to transfer a vessel and a syringe;
a syringe driving apparatus; and
a controller configured to perform control of the multi jointed robot and the syringe driving apparatus,
wherein the syringe driving apparatus includes
a cylinder body holder configured to hold a cylinder body of the syringe,
an actuator configured to pull and push a plunger of the syringe, and
a rotation mechanism configured to make the cylinder body holder and the actuator freely rotatable about an axial line intersecting with a center axial line of the syringe, and
wherein the controller is configured to control the multi-jointed robot so as to reverse a vertical relation between the vessel and the syringe in a state where the vessel is punctured by a needle of the syringe after disposing the vessel on a lower side of the syringe and making the needle of the syringe puncture the vessel.

2. The fluid transfer system according to claim 1, wherein the rotation mechanism includes a lock mechanism configured to switch an allowing state for allowing the rotation of the cylinder body holder and the actuator and a regulating state for regulating the rotation of the cylinder body holder and the actuator.

3. The fluid transfer system according to claim 2, wherein the lock mechanism is configured to switch the allowing state and the regulating state as the cylinder body holder and the actuator move along a rotation center of the rotation mechanism.

4. The fluid transfer system according to claim 3, wherein the multi jointed robot includes a gripper configured to grip the vessel or the syringe, a wrist portion configured to hold and rotate the gripper, and a multi jointed limb portion configured to transfer the wrist portion, and
wherein the syringe driving apparatus further includes an engaging portion configured to engage with the gripper in a state where a rotation center of the gripper and a rotation center of the rotation mechanism are matched with each other.

5. The fluid transfer system according to claim 3, wherein the controller is configured to perform
control of the multi-jointed robot so as to dispose the vessel containing the fluid on a lower side of the syringe after making the cylinder body holder hold the cylinder body of the syringe,
control of the multi-jointed robot so as to make a needle of the syringe puncture the vessel in a state where the vessel is disposed on the lower side of the syringe,
control of the multi-jointed robot so as to reverse a vertical relation between the vessel and the syringe by rotating the cylinder body holder and the actuator after making the rotation mechanism the allowing state by moving the cylinder body holder and the actuator along the rotation center of the rotation mechanism in a state where the needle punctures the vessel, and
control of the syringe driving apparatus so as to absorb the fluid in the vessel into the syringe by pulling the plunger in a state where the vessel is disposed on an upper side of the syringe.

6. The fluid transfer system according to claim 2, wherein the lock mechanism is configured to switch the allowing state and the regulating state by an electromagnetic brake.

7. The fluid transfer system according to claim 1, wherein the multi jointed robot includes a gripper configured to grip the vessel or the syringe, a wrist portion configured to hold and rotate the gripper, and a multi jointed limb portion configured to transfer the wrist portion, and
wherein the syringe driving apparatus further includes an engaging portion configured to engage with the gripper in a state where a rotation center of the gripper and a rotation center of the rotation mechanism are matched with each other.

8. The fluid transfer system according to claim 2, wherein the multi jointed robot includes a gripper configured to grip the vessel or the syringe, a wrist portion configured to hold and rotate the gripper, and a multi jointed limb portion configured to transfer the wrist portion, and
wherein the syringe driving apparatus further includes an engaging portion configured to engage with the gripper in a state where a rotation center of the gripper and a rotation center of the rotation mechanism are matched with each other.

9. The fluid transfer system according to claim 6, wherein the multi jointed robot includes a gripper configured to grip the vessel or the syringe, a wrist portion configured to hold and rotate the gripper, and a multi jointed limb portion configured to transfer the wrist portion, and
wherein the syringe driving apparatus further includes an engaging portion configured to engage with the gripper in a state where a rotation center of the gripper and a rotation center of the rotation mechanism are matched with each other.

10. The fluid transfer system according to claim 7, wherein the controller is configured to perform
control of the multi-jointed robot so as to dispose the vessel containing a fluid on a lower side of the syringe after making the cylinder body holder hold the cylinder body of the syringe,
control of the multi-jointed robot so as to make a needle of the syringe puncture the vessel in a state where the vessel is disposed on the lower side of the syringe,
control of the multi-jointed robot so as to reverse a vertical relation between the vessel and the syringe by engaging the gripper with the engaging portion and by rotating the gripper along with the cylinder body holder and the actuator in a state where the needle punctures the vessel, and
control of the syringe driving apparatus so as to absorb the fluid in the vessel into the syringe by pulling the plunger in a state where the vessel is disposed on an upper side of the syringe.

11. The fluid transfer system according to claim 1, wherein the controller is configured to perform
control of the multi-jointed robot so as to dispose the vessel containing a fluid on a lower side of the syringe after making the cylinder body holder hold the cylinder body of the syringe,
control of the multi-jointed robot so as to make a needle of the syringe puncture the vessel in a state where the vessel is disposed on the lower side of the syringe,
control of the multi-jointed robot so as to reverse a vertical relation between the vessel and the syringe by rotating the cylinder body holder and the actuator in a state where the needle punctures the vessel, and
control of the syringe driving apparatus so as to absorb the fluid in the vessel into the syringe by pulling the plunger in a state where the vessel is disposed on an upper side of the syringe.

12. A fluid transfer apparatus comprising:
a multi jointed robot configured to transfer a vessel and a syringe; and
a syringe driving apparatus,
wherein the syringe driving apparatus includes
a cylinder body holder configured to hold a cylinder body of the syringe,
an actuator configured to pull and push a plunger of the syringe, and
a rotation mechanism configured to make the cylinder body holder and the actuator freely rotatable about an axial line intersecting with a center axial line of the syringe so as to allow the multi jointed robot to reverse a vertical relation between the vessel and the syringe.

13. A method for controlling the fluid transfer apparatus according to claim 12, comprising:
performing control of the multi-jointed robot so as to dispose the vessel containing a fluid on a lower side of the syringe after making the cylinder body holder hold the cylinder body of the syringe;
performing control of the multi jointed robot so as to make a needle of the syringe puncture the vessel in a state where the vessel is disposed on the lower side of the syringe;
performing control of the multi-jointed robot so as to reverse a vertical relation between the vessel and the syringe by rotating the cylinder body holder and the actuator in a state where the needle punctures the vessel; and
performing control of the syringe driving apparatus so as to absorb the fluid in the vessel into the syringe by pulling the plunger in a state where the vessel is disposed on an upper side of the syringe.

14. A medicine manufacturing method of manufacturing a medicine by using the fluid transfer apparatus according to claim 12, comprising:
performing control of the multi-jointed robot so as to dispose a first vessel containing a raw liquid of the medicine on a lower side of the syringe after making the cylinder body holder hold the cylinder body of the syringe;
performing control of the multi jointed robot so as to make a needle of the syringe puncture the first vessel in a state where the first vessel is disposed on the lower side of the syringe;
performing control of the multi-jointed robot so as to reverse a vertical relation between the first vessel and the syringe by rotating the cylinder body holder and the actuator in a state where the needle punctures the first vessel;
performing control of the syringe driving apparatus so as to absorb the raw liquid medicine in the first vessel into the syringe by pulling the plunger in a state where the first vessel is disposed on an upper side of the syringe;
performing control of the multi jointed robot so as to remove the needle from the first vessel;
performing control of the multi jointed robot so as to make the needle face the lower side by rotating the cylinder body holder and the actuator in a state where the needle is removed from the first vessel;
performing control of the multi-jointed robot so as to dispose a second vessel for the medicine on the lower side of the syringe;
performing control of the multi jointed robot so as to make the needle puncture the second vessel in a state where the second vessel is disposed on the lower side of the syringe; and
performing control of the syringe driving apparatus so as to inject the raw liquid medicine in the syringe into the second vessel by pushing the plunger.